US012777023B2

(12) United States Patent
Maghnani et al.

(10) Patent No.: US 12,777,023 B2
(45) Date of Patent: Oct. 27, 2026

(54) METHOD AND APPARATUS FOR SECURE BYTE-LEVEL FILE TRANSMISSION USING WEIGHTED FAIR QUEUEING AND BLOCK INTERPOSERS

(71) Applicant: Bank of America Corporation, Charlotte, NC (US)

(72) Inventors: Vinod Maghnani, Gurugram (IN); Atul Sharma, Gurugram (IN)

(73) Assignee: Bank of America Corporation, Charlotte, NC (US)

(*) Notice: Subject to any disclaimer, the term of this patent is extended or adjusted under 35 U.S.C. 154(b) by 0 days.

(21) Appl. No.: 19/045,942

(22) Filed: Feb. 5, 2025

(65) Prior Publication Data

US 2026/0230453 A1 Aug. 6, 2026

(51) Int. Cl.

| | |
|---|---|
| ***H04L 9/40*** | (2022.01) |
| ***H04L 47/34*** | (2022.01) |
| ***H04L 47/62*** | (2022.01) |
| ***H04L 67/06*** | (2022.01) |

(52) U.S. Cl.

CPC .......... *H04L 63/0428* (2013.01); *H04L 47/34* (2013.01); *H04L 47/6215* (2013.01); *H04L 67/06* (2013.01)

(58) Field of Classification Search

None

See application file for complete search history.

(56) References Cited

U.S. PATENT DOCUMENTS

| | | | | |
|---|---|---|---|---|
| 6,101,193 | A | 8/2000 | Ohba | |
| 7,551,620 | B1 * | 6/2009 | Samuels | H04L 47/38 370/394 |
| 7,643,418 | B1 * | 1/2010 | Varier | H04L 47/10 370/232 |
| 8,321,871 | B1 | 11/2012 | Jackson | |
| 8,904,181 | B1 | 12/2014 | Felsher et al. | |
| 9,419,951 | B1 | 8/2016 | Felsher et al. | |

(Continued)

FOREIGN PATENT DOCUMENTS

WO 2014082619 A2 6/2014

*Primary Examiner* — Kaveh Abrishamkar

(74) *Attorney, Agent, or Firm* — Banner & Witcoff, Ltd.

(57) ABSTRACT

A method and apparatus for secure and efficient file transmission across distributed networks using byte-level segmentation, Weighted Fair Queueing (WFQ), and block interposer mechanisms. Files are divided into byte-sized units (BCODEs), each assigned a unique identifier comprising a string code and sequence number. WFQ schedules the transmission of these units by assigning priority weights based on criticality, ensuring optimal bandwidth allocation and fairness. A block interposer validates the integrity of each byte during transmission and retransmits corrupted units through alternate paths, enhancing security and reliability. The system supports multi-path transmission, dynamically redistributing retransmitted bytes to mitigate interception risks. A byte collector at the receiver's end validates, reassembles, and stores transmitted data, ensuring integrity and order. The invention's modular design allows scalability and compatibility with diverse network configurations, providing a robust framework for secure, efficient, and granular data handling in modern distributed environments.

20 Claims, 9 Drawing Sheets

Sample System Architecture Diagram

(56) References Cited

U.S. PATENT DOCUMENTS

| | | | | |
|---|---|---|---|---|
| 2003/0219026 | A1 | 11/2003 | Sun et al. | |
| 2006/0098675 | A1 | 5/2006 | Okuno | |
| 2008/0031229 | A1 | 2/2008 | Michelson et al. | |
| 2008/0031234 | A1 | 2/2008 | Sbisa et al. | |
| 2008/0092024 | A1* | 4/2008 | Lou | H03M 13/3738 714/792 |
| 2009/0219949 | A1 | 9/2009 | Iwazaki | |
| 2009/0249117 | A1 | 10/2009 | Horikoshi | |
| 2010/0162012 | A1 | 6/2010 | Cornwell et al. | |
| 2010/0290456 | A1 | 11/2010 | Mutikainen et al. | |
| 2011/0044174 | A1 | 2/2011 | Szymanski | |
| 2011/0116456 | A1 | 5/2011 | Gaal et al. | |
| 2011/0216766 | A1 | 9/2011 | Peters, Jr. et al. | |
| 2012/0093045 | A1 | 4/2012 | Zhou et al. | |
| 2012/0265932 | A1 | 10/2012 | Jibbe et al. | |
| 2013/0007234 | A1 | 1/2013 | Bartfai-Walcott et al. | |
| 2013/0007235 | A1 | 1/2013 | Humphreys et al. | |
| 2013/0022046 | A1* | 1/2013 | Vasseur | H04L 45/24 370/392 |
| 2013/0058315 | A1 | 3/2013 | Feuersanger et al. | |
| 2013/0135996 | A1 | 5/2013 | Torres et al. | |
| 2014/0129876 | A1 | 5/2014 | Addepalli et al. | |
| 2021/0117360 | A1* | 4/2021 | Kutch | G06F 3/0656 |
| 2021/0150339 | A1* | 5/2021 | Iyer | G06N 3/08 |
| 2022/0086100 | A1* | 3/2022 | Biederman | H04L 47/6215 |
| 2022/0094675 | A1 | 3/2022 | Madisetti et al. | |
| 2022/0353181 | A1 | 11/2022 | Vasseur et al. | |
| 2024/0406117 | A1 | 12/2024 | Tourrilhes et al. | |
| 2026/0030489 | A1 | 1/2026 | Moran | |
| 2026/0046317 | A1* | 2/2026 | Crabtree | H04L 63/104 |

* cited by examiner

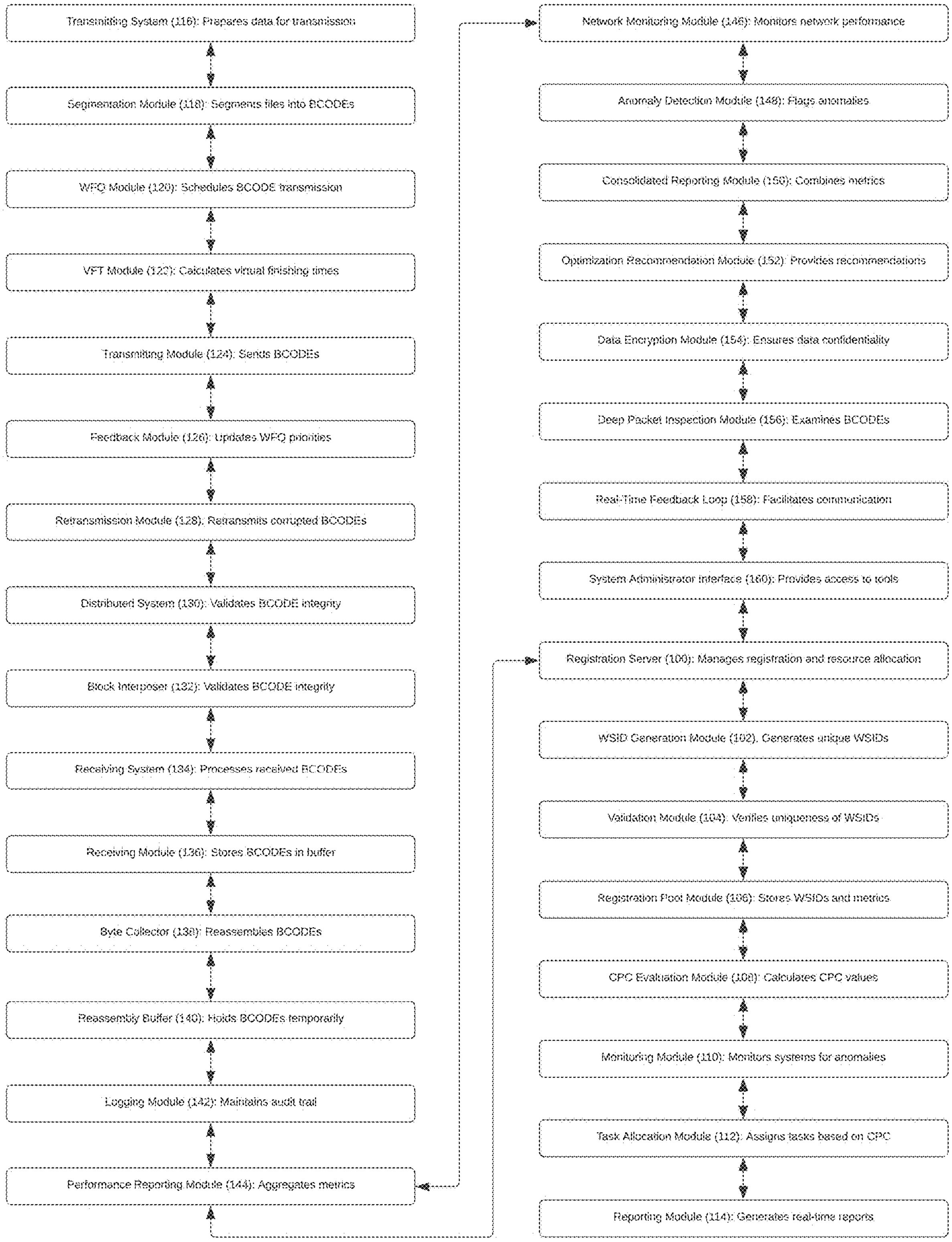
FIG. 1: Sample System Architecture Diagram

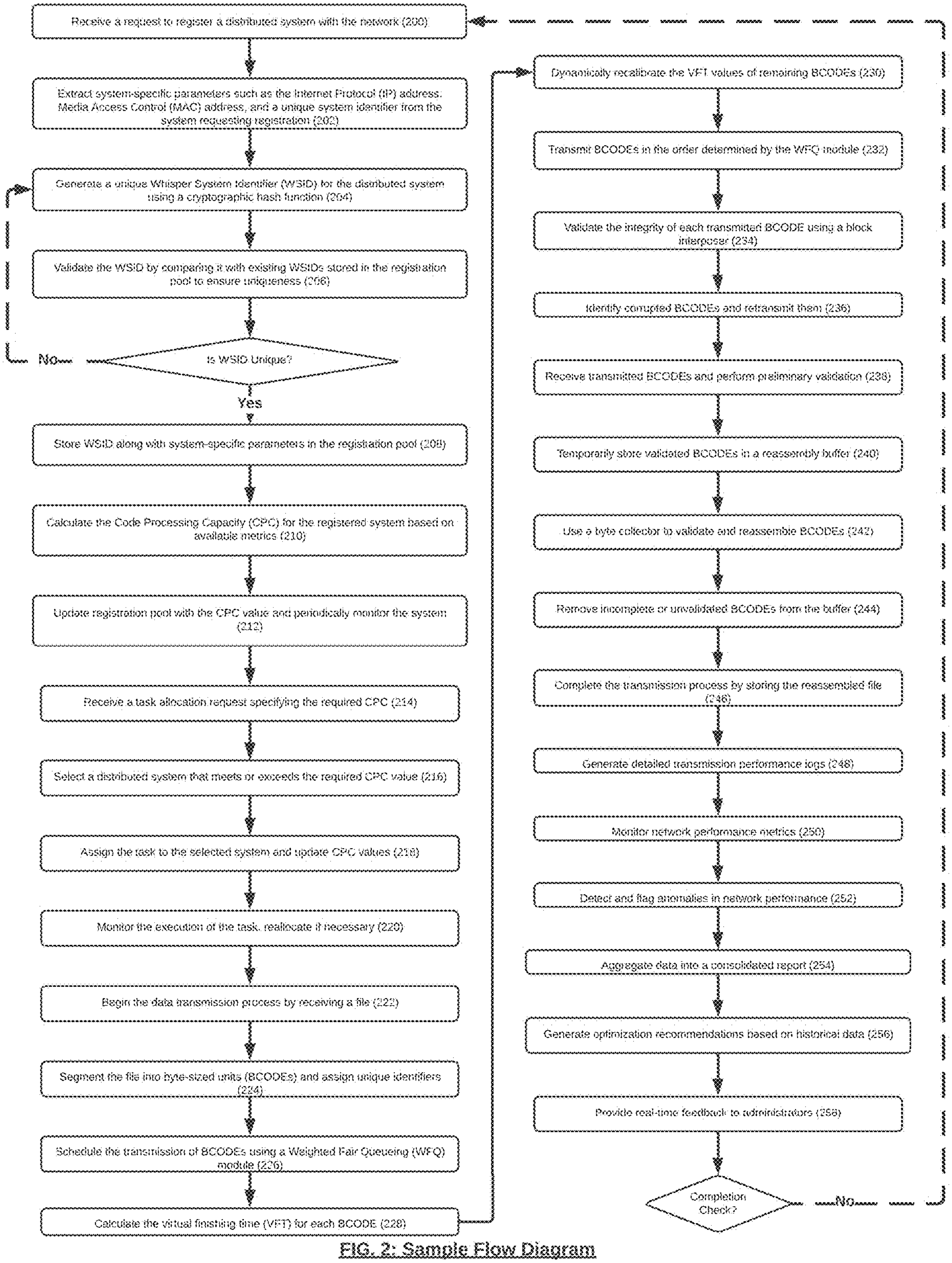
FIG. 2: Sample Flow Diagram

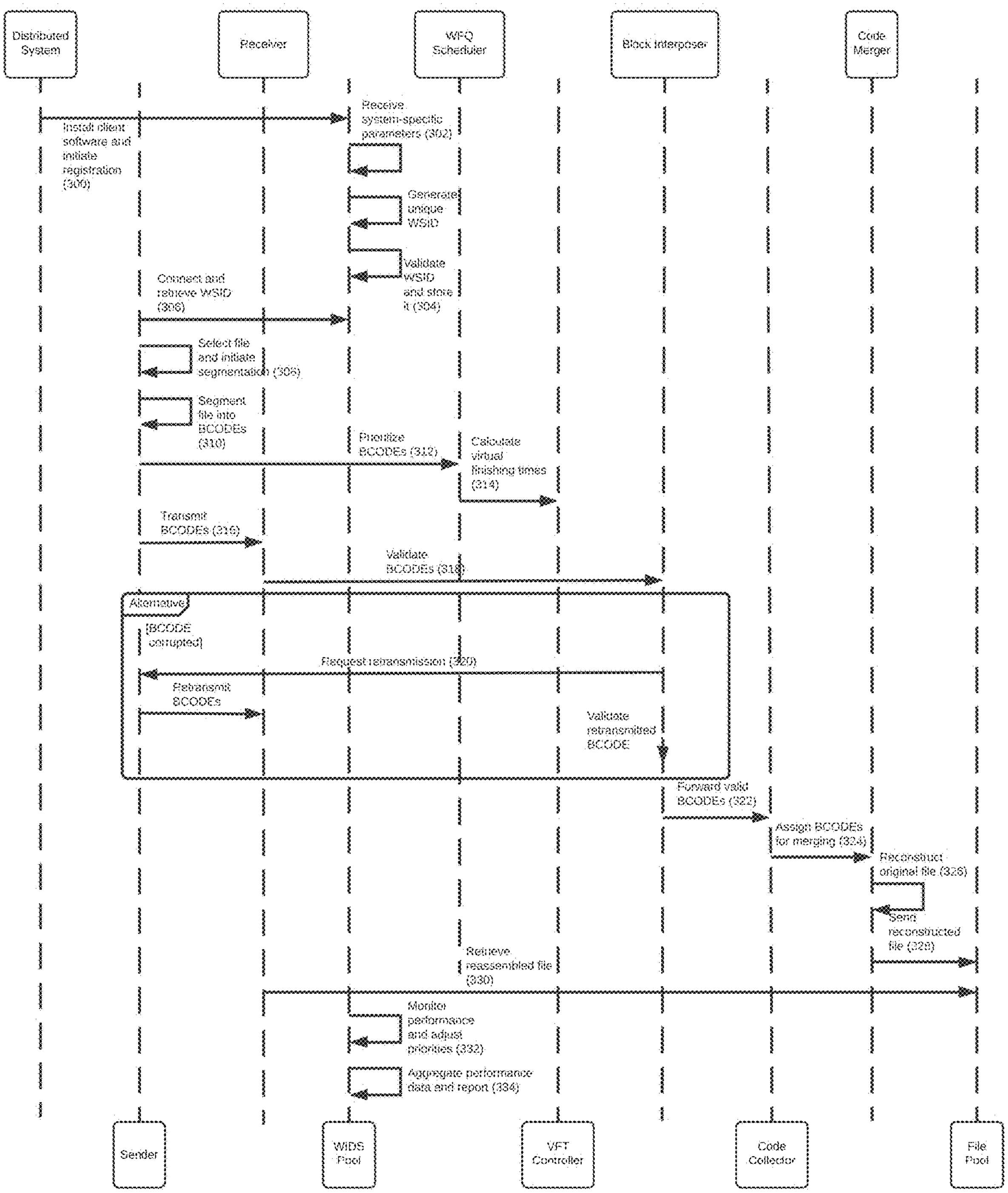
FIG. 3: Sample Technical Solution Sequence Diagram

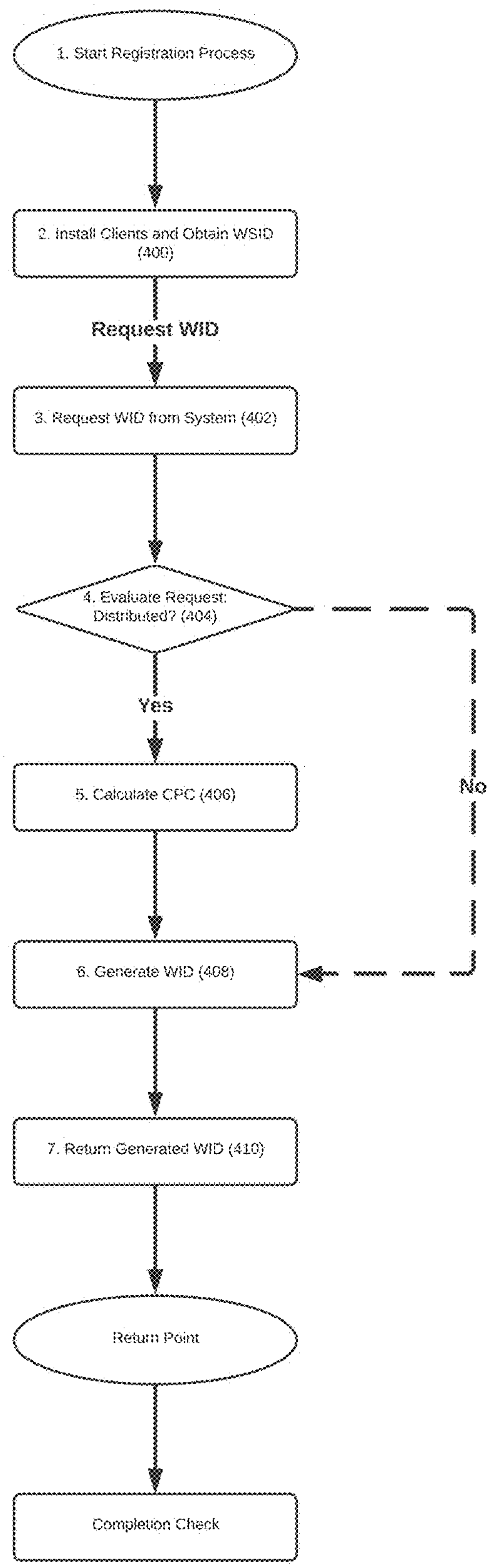
FIG. 4: Sample Flow Diagram for Registration Algorithm

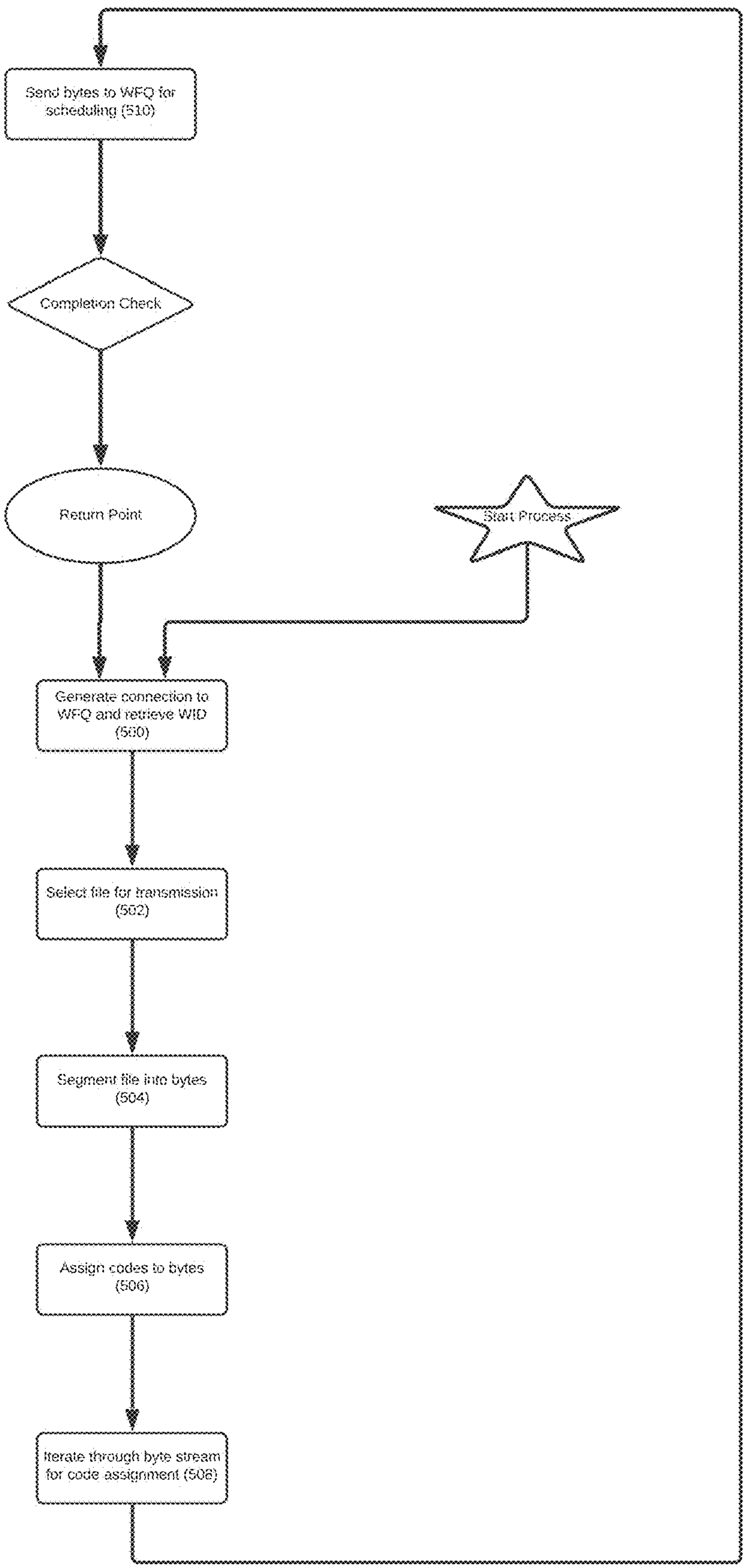
FIG. 5: Sample Flow Diagram for Data/File Sending Algorithm

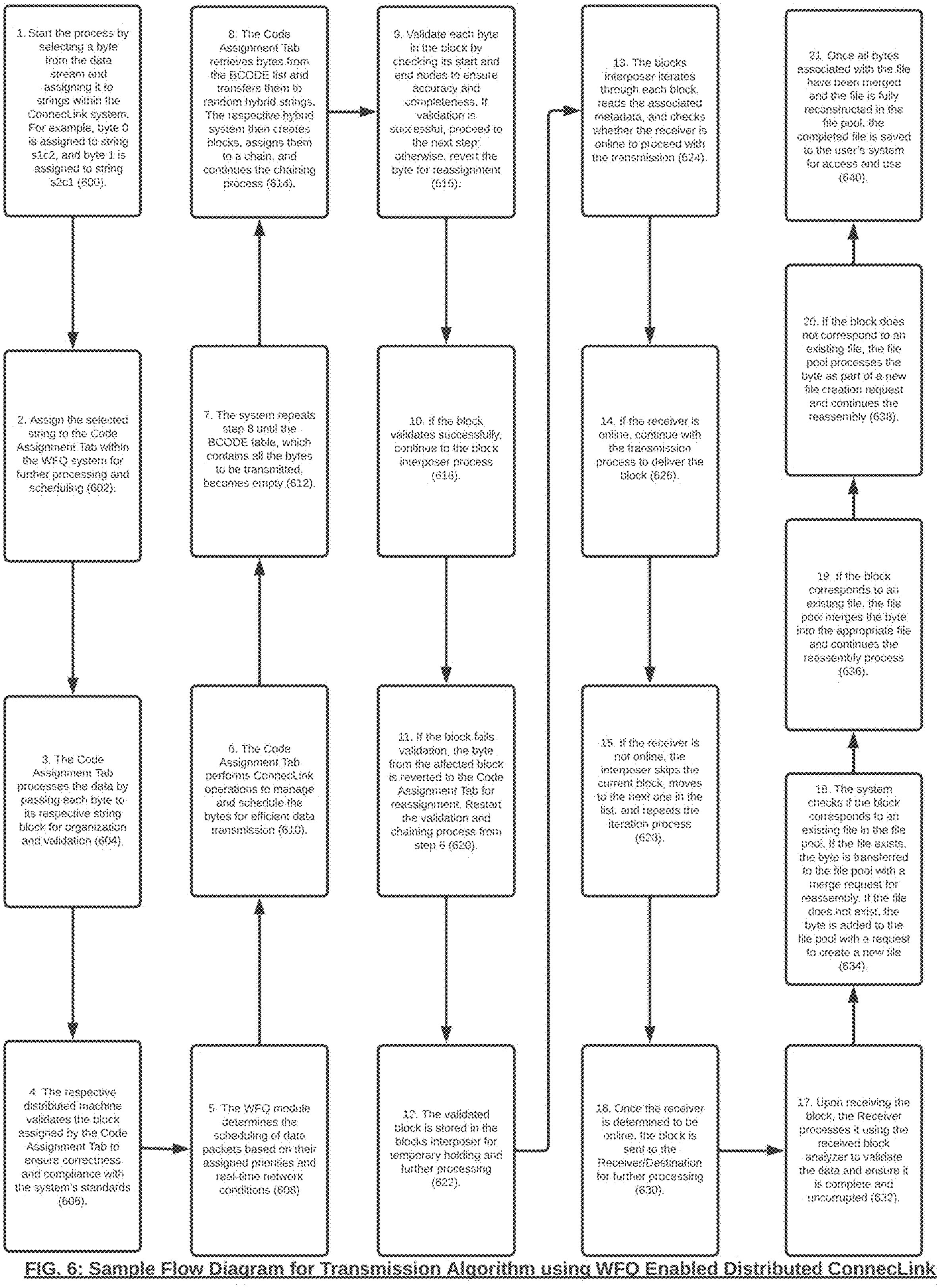
FIG. 6: Sample Flow Diagram for Transmission Algorithm using WFQ Enabled Distributed ConnecLink

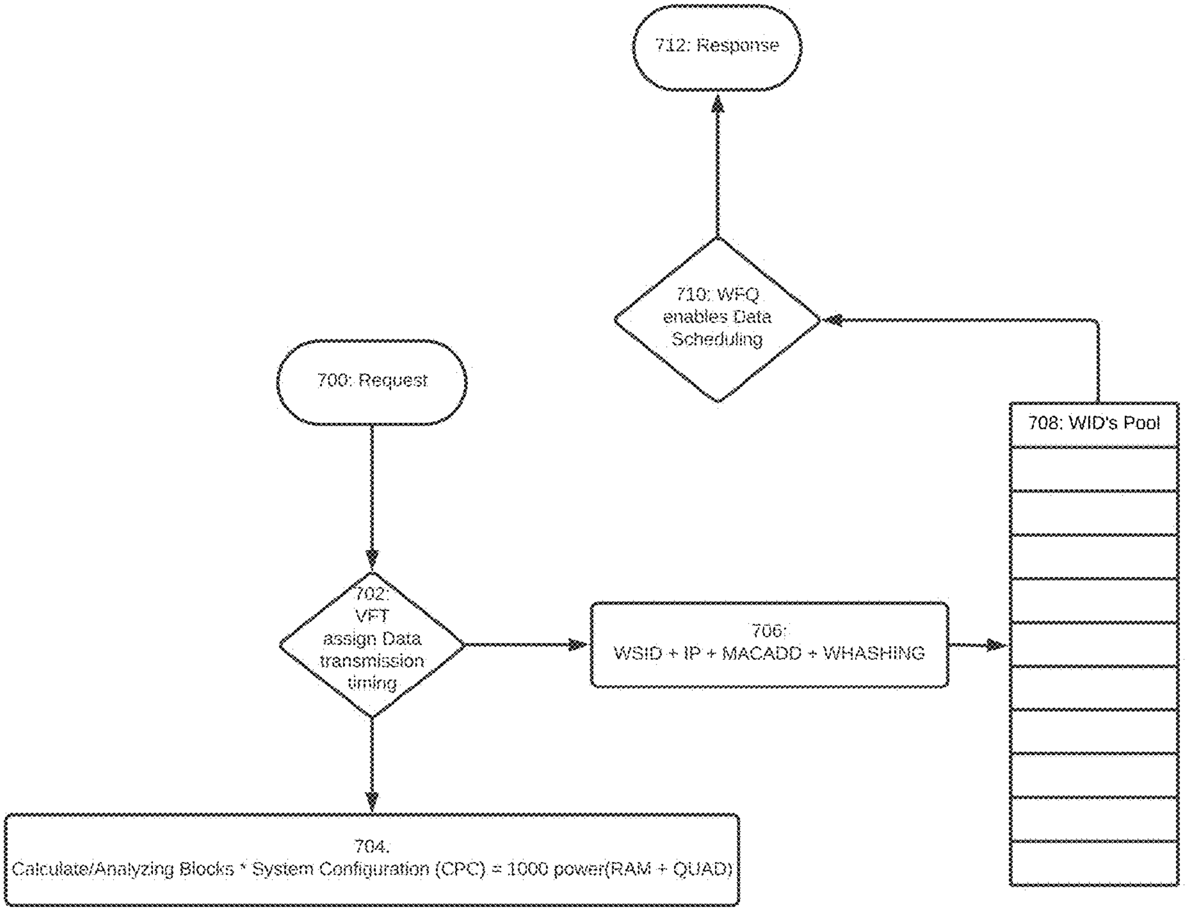
Notes:
- CPC stands for code processing capacity.
- 'W' in WID stands for Whisper.
- Defined data transferring using this WID is silent and secured
FIG. 7: First Sample Process Flow Diagram for Technical Solution

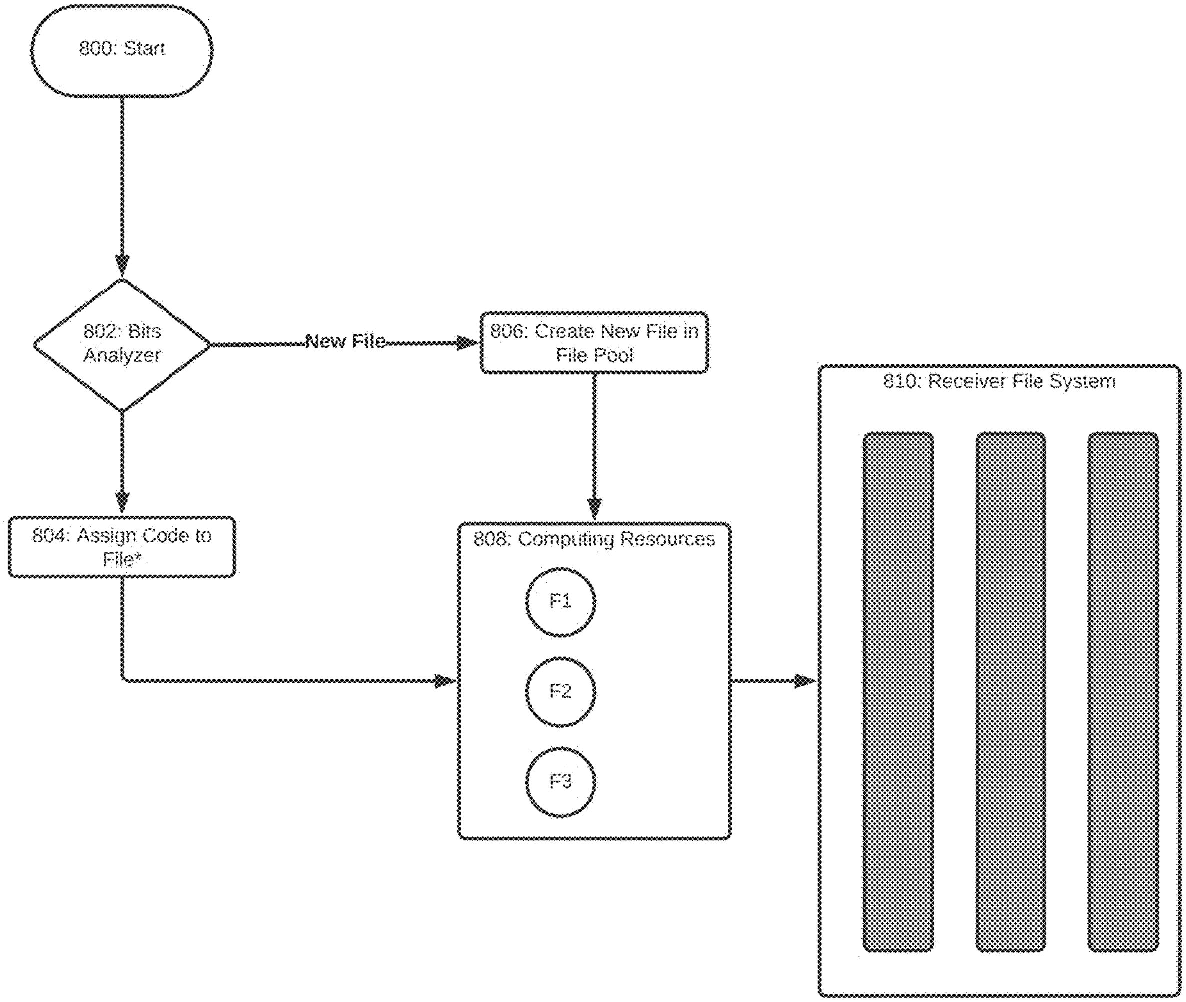
Notes:
- Bit Analyzer is responsible to identified whether the given byte is for new file or for the existing file which is present in file pool.
- File pool release the file once its completed.
FIG. 8: Second Sample Process Flow Diagram for Technical Solution

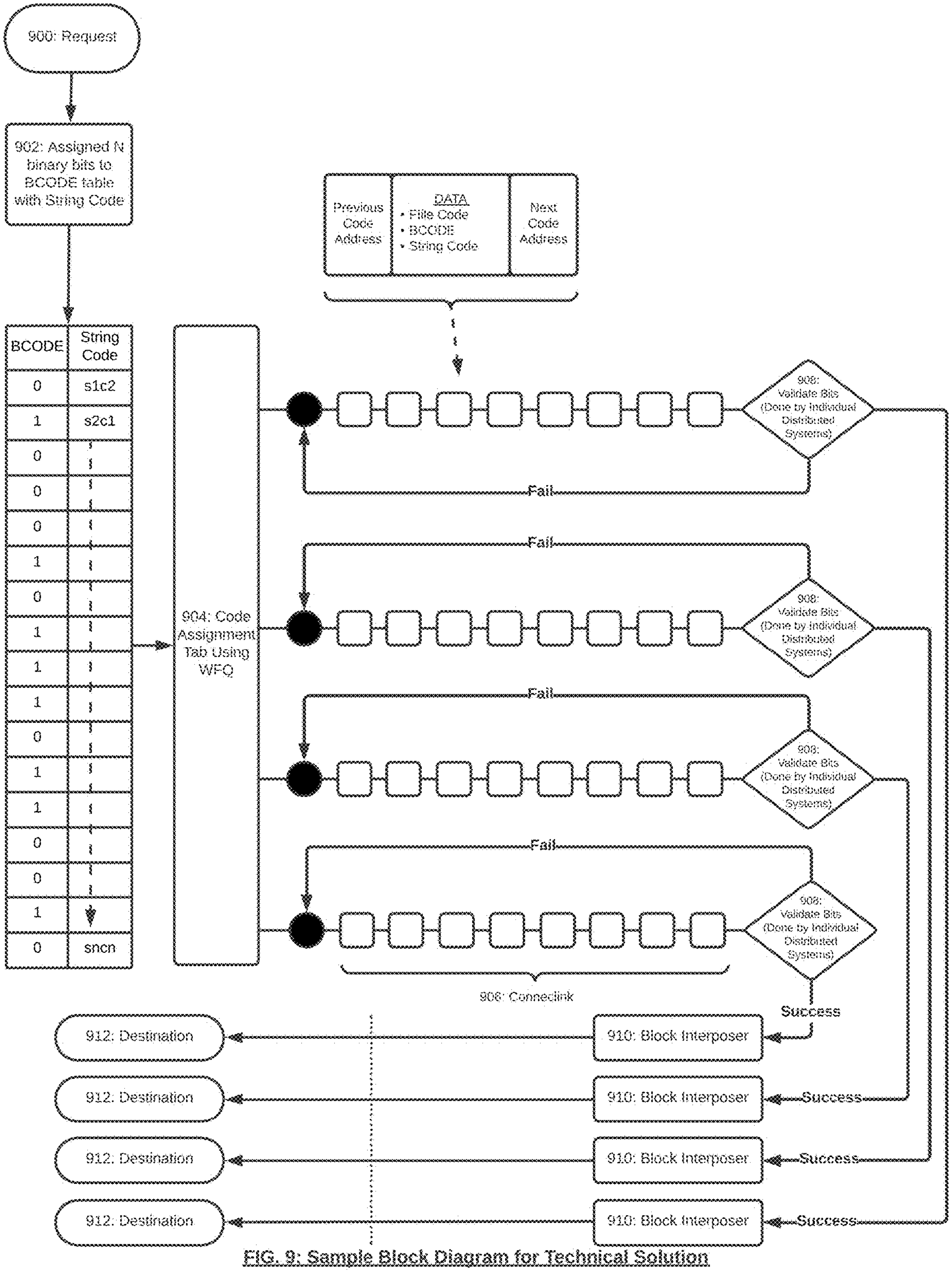
FIG. 9: Sample Block Diagram for Technical Solution

METHOD AND APPARATUS FOR SECURE BYTE-LEVEL FILE TRANSMISSION USING WEIGHTED FAIR QUEUEING AND BLOCK INTERPOSERS

TECHNICAL FIELD

The inventions disclosed herein pertain to the fields of network data transfer and management, error detection and recovery in data transmission systems, packet switching and data flow control, cryptography and secure communication systems, and computer architecture and resource allocation in distributed computing systems. These fields collectively involve methods and systems for optimizing data transmission across distributed networks, ensuring secure and uninterrupted communication between computing devices. This includes technologies for detecting and correcting errors during data transmission, scheduling and routing data packets with fair bandwidth allocation and prioritization, and applying encryption techniques to prevent unauthorized access or tampering. Additionally, the inventions address the design and management of distributed networks, focusing on registering computing resources, dynamically allocating processing capacity, and optimizing data handling across multiple interconnected systems.

DESCRIPTION OF THE RELATED ART

In modern network systems, data transmission between distributed computing environments is a fundamental operation. However, this process is fraught with challenges that compromise both efficiency and security. One of the most significant problems is the inability of current systems to maintain uninterrupted communication in the presence of network disruptions. Disconnections during data transfers often result in incomplete transmissions, necessitating the retransmission of entire data sets, which wastes bandwidth and computational resources. This inefficiency becomes particularly critical in scenarios involving large-scale data transfers or real-time communications, where delays and interruptions can have severe consequences.

Security vulnerabilities in data transmission further exacerbate the challenges faced by organizations. During network disruptions, malicious actors can target vulnerabilities to intercept or manipulate data. This issue is particularly concerning for sensitive information, such as financial transactions, user authentication credentials, or proprietary data, where even a minor breach can lead to catastrophic consequences. Existing methods to secure transmissions often rely on encrypting the data as a whole, but they do not adequately address threats arising from partial data interception or manipulation during reassembly.

Another critical issue lies in the lack of granularity in current error detection and correction systems. When a transmission error occurs, these systems often resort to retransmitting the entire data set, even if only a small portion of the data is corrupted. This approach is inefficient and increases the latency of transmissions, particularly in high-traffic networks. It also imposes an undue computational burden on the systems involved, limiting their ability to handle concurrent tasks and affecting overall performance.

Bandwidth management in current systems presents yet another problem. Many systems fail to allocate network resources effectively, leading to congestion in high-priority data transmissions while low-priority data consumes disproportionate bandwidth. This imbalance creates bottlenecks, where critical data such as financial transactions, real-time notifications, or security updates experience delays while non-critical transmissions monopolize available resources. The inability to prioritize traffic effectively degrades the quality of service and impacts user experience in applications requiring low latency and high reliability.

The increasing complexity of distributed networks also creates challenges in tracking and managing transmission processes. Current systems lack robust mechanisms to uniquely identify and monitor the participating nodes, particularly in dynamic environments where devices frequently join or leave the network. This gap complicates the management of distributed resources and increases the risk of unauthorized access, as compromised nodes cannot always be reliably isolated or neutralized during ongoing transmissions.

Moreover, the lack of fault tolerance in current transmission systems undermines their reliability. A single point of failure, such as the corruption of a critical data packet, can disrupt the entire transmission process. In many cases, this requires a complete restart of the data transfer, further exacerbating inefficiencies and increasing the risk of data loss. Existing solutions do not adequately address this issue, as they are often designed for static, predictable environments rather than dynamic, real-time applications.

The scalability of current systems also poses a significant challenge. As data volumes grow exponentially, traditional systems struggle to handle the increasing load. The absence of mechanisms to distribute and optimize transmission tasks across multiple nodes limits the ability to scale operations effectively. This limitation is particularly problematic for industries such as finance and telecommunications, where data volumes are immense, and the demand for real-time processing is high.

Another issue with current systems is their susceptibility to timing-related inefficiencies. Without precise control over the scheduling and completion of data packets, network congestion and delays become prevalent. Many systems rely on first-in-first-out or round-robin scheduling techniques that fail to account for the varying priorities and sizes of data packets. This oversight results in suboptimal utilization of network resources, where critical packets are delayed or lost while less critical data consumes available bandwidth.

In addition to these technical issues, current systems often lack the flexibility to adapt to changing network conditions. Static configurations and rigid protocols hinder their ability to respond to fluctuations in traffic, varying network loads, or unexpected failures. This inflexibility compromises the performance and reliability of transmissions, especially in environments where conditions change dynamically, such as cloud-based or edge computing systems.

Another significant problem is the inability to ensure data integrity during transmission. Without robust mechanisms to validate and authenticate data at the granular level, there is an increased risk of corruption or tampering, especially when data passes through multiple intermediaries. This vulnerability is particularly problematic for applications that rely on distributed networks, as the integrity of the transmitted data is critical for accurate and reliable operations.

Existing systems also lack adequate support for multi-path transmissions. Most current implementations are designed to use a single transmission path, which becomes a bottleneck and a point of failure. Multi-path transmission methods, which could distribute data across multiple routes to enhance reliability and security, are either underdeveloped or not implemented at scale. This gap limits the potential for optimizing transmission speed and redundancy in high-performance networks.

Additionally, the inability to efficiently retransmit corrupted data without redundancy creates unnecessary overhead. In many cases, existing systems retransmit both valid and invalid portions of the data, increasing the transmission time and network load. This inefficiency not only slows down critical processes but also increases operational costs, especially in systems that charge based on bandwidth usage.

The inefficiency of resource allocation in distributed systems further compounds these challenges. Current solutions often fail to account for the processing capacity of individual nodes when assigning transmission tasks, leading to imbalances where some nodes are overwhelmed while others remain underutilized. This imbalance reduces the overall throughput of the network and increases the likelihood of failures due to overloading.

Another limitation of existing systems is their inability to provide granular control over data transmission policies. For example, critical data may require stricter security measures and higher priority during transmission, while less sensitive data can tolerate lower levels of protection. Current systems lack the capability to enforce such differentiated policies effectively, resulting in either excessive overhead or insufficient security.

The long-felt and unmet need for the invention lies in the inability of existing systems to combine robust error handling, optimized scheduling, and enhanced security into a cohesive framework. The inefficiencies, vulnerabilities, and inflexibilities of traditional data transmission methods have persisted despite advancements in related technologies. A comprehensive solution that addresses these challenges is critical for modern distributed networks to meet the demands of real-time, secure, and scalable operations. This need has been long recognized but remains unsolved, presenting a significant opportunity for innovation.

SUMMARY OF THE INVENTION

The first aspect of inventions disclosed herein introduces a system and method for the registration and resource allocation of distributed systems using unique Whisper System IDs (WSIDs) and Whisper IDs (WIDs). This invention enables precise identification and tracking of sender, receiver, and intermediary systems within a distributed network. Each WSID uniquely represents a system, while each WID identifies a specific transmission session or file. These identifiers are dynamically generated using a combination of system-specific parameters such as IP addresses, MAC addresses, and hash values. The invention incorporates a Code Processing Capacity (CPC) metric that evaluates the computational resources of each system, including RAM and processing power, to optimize the distribution of tasks across the network. By leveraging these unique identifiers and CPC metrics, the invention ensures efficient initialization and dynamic task allocation, improving system scalability and reliability in distributed environments.

The second aspect of inventions disclosed herein focuses on a novel method and apparatus for secure, byte-level file transmission across distributed networks. This system employs Weighted Fair Queueing (WFQ), a packet scheduling technique, to assign priorities to data segments based on their criticality. Files are divided into smaller byte-sized units, referred to as BCODEs, with each unit assigned a unique identifier composed of a string code and a sequence number. These byte-sized units are transmitted individually across multiple distributed systems, reducing the risk of interception or corruption. A block interposer mechanism is introduced to validate each byte during transmission. In the event of corruption or tampering, the affected byte is retransmitted using an alternate path, ensuring both security and reliability. This granular approach to file transmission not only improves security but also minimizes the bandwidth and computational overhead associated with retransmitting entire files. The invention also supports multi-path transmissions, dynamically reallocating corrupted bytes to alternative routes, thereby enhancing transmission efficiency and security.

The third aspect of inventions disclosed herein is a system and method for optimized data transmission using the Virtual Finishing Timing (VFT) technique in conjunction with WFQ. VFT is a novel algorithm that calculates an estimated completion time for each packet in a transmission session, taking into account critical factors such as packet size, priority, and current network load. This invention ensures that data packets are scheduled and transmitted in the most efficient order, prioritizing high-criticality packets without starving lower-priority ones. WFQ complements VFT by maintaining separate queues for different traffic classes and dynamically adjusting resource allocation based on changing network conditions. Together, VFT and WFQ enable a highly efficient and fair scheduling system that prevents delays, optimizes bandwidth utilization, and reduces packet loss. The invention is further enhanced by its ability to adapt to dynamic network environments, making it suitable for real-time applications and high-demand scenarios. By combining precise timing calculations with intelligent queue management, the invention delivers a robust framework for improving data transmission performance in distributed networks.

These inventions collectively address the critical aspects of identification, security, and optimization in distributed network transmissions, incorporating unique and innovative features such as WSIDs, WIDs, BCODEs, block interposers, WFQ, and VFT. Their integration of resource-aware algorithms, granular data management, and dynamic adaptability ensures high performance, scalability, and security in modern distributed computing environments.

Individually, and more specifically, the first invention is a comprehensive system and method for registering distributed systems and allocating resources within a network using unique Whisper System IDs (WSIDs) and Whisper IDs (WIDs). This invention enables precise identification, tracking, and management of sender, receiver, and intermediary systems in distributed computing environments. At its core, the invention relies on the dynamic generation and assignment of identifiers that are unique to each system and each transmission session. The WSID uniquely identifies individual systems participating in the network, such as servers, nodes, or client devices, while the WID corresponds to specific data transmission sessions, enabling the system to differentiate between multiple concurrent transmissions. These identifiers are critical to maintaining the integrity and organization of network operations.

The invention employs a multi-factor approach for generating WSIDs and WIDs, using a combination of system-specific parameters such as IP addresses, MAC addresses, and cryptographic hash functions. This ensures that each identifier is unique and resistant to tampering or duplication. The inclusion of these parameters not only enhances the security of the system but also provides a reliable way to associate transmission activities with specific devices or sessions. These identifiers are dynamically generated and stored in a registration pool, allowing the system to efficiently manage ongoing transmissions and provide real-time updates on the status of each registered system and session.

A key aspect of the invention is the incorporation of a Code Processing Capacity (CPC) metric, which evaluates the computational resources of each system in the network. CPC is determined based on factors such as available RAM, processor capabilities, and overall system performance. This metric is used to optimize task distribution across the network by ensuring that tasks are allocated to systems capable of handling them efficiently. For example, systems with higher CPC values are assigned larger or more complex tasks, while those with lower CPC values handle smaller or simpler tasks. This dynamic allocation ensures optimal utilization of network resources, reducing bottlenecks and enhancing overall performance.

The invention also introduces a dynamic resource allocation mechanism that works in conjunction with the WSIDs, WIDs, and CPC metrics. Once systems are registered and their CPC values are evaluated, the system dynamically assigns tasks based on current network conditions and resource availability. This approach prevents overloading any single system while ensuring that resources are used efficiently across the network. The dynamic allocation mechanism is particularly beneficial in distributed environments with varying workloads, as it allows the system to adapt to changing conditions in real time.

Another inventive feature of this system is its ability to manage and monitor multiple concurrent transmissions within the network. By associating each transmission session with a unique WID, the invention enables precise tracking of data flows, ensuring that each transmission is correctly routed and completed. The WSID-WID framework also allows the system to isolate and address issues in individual transmissions without affecting other ongoing sessions. This granular level of control enhances the reliability and robustness of the system, making it suitable for use in high-demand applications.

The invention further incorporates mechanisms for maintaining the integrity and security of registered systems and transmissions. The use of cryptographic hash functions in generating WSIDs and WIDs provides a layer of protection against unauthorized modifications or impersonation. Additionally, the dynamic nature of these identifiers ensures that they cannot be easily predicted or reused, further enhancing the security of the system. These features make the invention well-suited for applications where data integrity and security are paramount, such as financial transactions or the transmission of sensitive information.

Another unique aspect of the invention is its scalability. The system is designed to accommodate networks of varying sizes, from small local environments to large-scale distributed systems. By dynamically generating and managing WSIDs and WIDs, the invention can efficiently handle the registration and resource allocation needs of networks with thousands or even millions of systems. This scalability makes the invention highly adaptable to the needs of different industries and applications, providing a versatile solution for managing distributed networks.

The invention also introduces a registration pool for storing WSIDs and WIDs, which serves as a centralized repository for managing system and session identifiers. This pool allows the system to quickly retrieve and update information about registered systems and ongoing transmissions, enabling real-time monitoring and control. The registration pool is implemented using secure and efficient data structures that ensure fast access times and minimal overhead, even in large-scale networks.

The inclusion of a monitoring component in the system further enhances its capabilities. This component continuously evaluates the performance and status of registered systems, identifying potential issues such as resource depletion or connectivity problems. By proactively addressing these issues, the system ensures uninterrupted operation and minimizes the risk of failures. The monitoring component also provides valuable insights into network performance, enabling administrators to optimize configurations and improve overall efficiency.

Another key feature of the invention is its adaptability to different types of networks and system architectures. The WSID-WID framework is designed to be compatible with a wide range of devices and protocols, allowing it to be seamlessly integrated into existing infrastructures. This compatibility ensures that the invention can be deployed in a variety of settings, from traditional data centers to cloud-based and edge computing environments.

The invention also supports hierarchical resource allocation, where tasks are distributed based on a combination of system-level and network-level factors. This approach allows the system to prioritize critical transmissions while maintaining a balanced workload across the network. For example, high-priority tasks may be assigned to systems with the highest CPC values, while lower-priority tasks are distributed among less capable systems. This hierarchical allocation ensures that the network operates efficiently and meets the demands of different applications.

The use of unique identifiers also enables advanced analytics and reporting capabilities. By associating each transmission session with a WID, the system can generate detailed logs and reports on network activity, including metrics such as transmission times, error rates, and resource utilization. These insights provide valuable information for optimizing network performance and identifying areas for improvement.

The invention is further enhanced by its fault-tolerant design. In the event of a system failure or disruption, the WSID-WID framework allows the system to quickly reassign tasks to other available systems, minimizing the impact on ongoing transmissions. This resilience ensures that the network remains operational even under adverse conditions, making the invention suitable for mission-critical applications.

The ability to dynamically allocate resources and adapt to changing network conditions is another core aspect of the invention. By continuously evaluating CPC metrics and other performance indicators, the system ensures that resources are used efficiently and that tasks are completed in a timely manner. This adaptability makes the invention highly effective in environments where workloads and resource availability fluctuate.

The invention's integration of unique identifiers, resource-aware allocation, and real-time monitoring provides a comprehensive solution for managing distributed networks. Its scalability, security, and adaptability make it a highly valuable tool for modern computing environments. This system addresses the need for efficient and reliable network management, enabling organizations to optimize their operations and achieve greater levels of performance and security.

The second invention is a novel method and apparatus for achieving secure, efficient, and reliable file transmission at a granular byte level across distributed networks. The invention revolves around the segmentation of files into smaller units, known as BCODEs, each uniquely identified by a combination of string codes and sequence numbers. This approach ensures precise tracking, management, and verification of data during transmission. By transmitting files in these byte-sized units, the invention significantly enhances security and reliability while reducing the computational and bandwidth overhead associated with traditional methods that rely on transmitting entire files.

A central feature of this invention is the application of Weighted Fair Queueing (WFQ), a sophisticated packet scheduling algorithm. WFQ enables the prioritization of byte transmissions based on their criticality or importance, ensuring that high-priority data is transmitted ahead of less critical information. The algorithm assigns a weight to each byte, reflecting its priority, and schedules its transmission accordingly. This dynamic allocation ensures optimal utilization of network resources while maintaining a fair distribution of bandwidth among all data flows. The prioritization mechanism ensures that critical data, such as authentication tokens or financial transactions, receives expedited handling.

The invention incorporates a unique block interposer mechanism that validates each byte during transmission. The block interposer acts as a gatekeeper, checking the integrity and authenticity of each transmitted byte. If a byte is found to be corrupted or tampered with, it is flagged for retransmission through an alternate route. This ensures that only valid and authenticated data reaches its destination, significantly enhancing the security of the transmission. The use of the block interposer eliminates the need for retransmitting entire files, as only the affected bytes are retransmitted, thereby reducing bandwidth consumption and transmission delays.

Another core aspect of this invention is its support for multi-path transmission, which enhances both security and reliability. When a byte is flagged for retransmission, the system dynamically reassigns it to an alternate transmission path using WFQ. This ensures that a compromised byte does not follow the same path, reducing the likelihood of further interception or manipulation. The multi-path approach also improves fault tolerance by distributing data across multiple paths, minimizing the impact of network failures on overall transmission.

The invention's byte-level granularity introduces a new level of flexibility and control in data transmission. Each byte is individually encoded and tagged with metadata, including its sequence number, unique identifier, and references to its preceding and succeeding bytes. This metadata ensures that bytes can be accurately reassembled in the correct order at the receiver's end, even if they arrive out of sequence. The granular approach also allows for precise error correction and retransmission, as the system can isolate and address issues at the byte level without impacting other parts of the transmission.

A significant innovation in this invention is its ability to dynamically adapt to changing network conditions. By continuously monitoring factors such as network load, latency, and bandwidth availability, the system adjusts the transmission schedule and path assignments for each byte. This adaptability ensures consistent performance and minimizes the impact of network congestion or other disruptions on data transmission. The system's dynamic nature makes it suitable for use in real-time applications, where delays and interruptions are unacceptable.

The invention integrates advanced encryption techniques to further enhance the security of byte transmissions. Each byte is encrypted before transmission, ensuring that intercepted data cannot be easily deciphered. The use of unique identifiers and string codes for each byte adds an additional layer of protection, as these identifiers are dynamically generated and resistant to prediction or duplication. The encryption and identification mechanisms work together to create a secure and robust framework for transmitting sensitive information.

The system also includes a byte collector module at the receiver's end, which is responsible for validating, reassembling, and storing received bytes. The byte collector cross-verifies the metadata of each received byte against the expected sequence, ensuring that all data is accounted for and correctly ordered. If any byte is missing or corrupted, the collector communicates with the sender to initiate a retransmission. This mechanism ensures the integrity and completeness of the reassembled file, regardless of transmission conditions.

Another key feature of the invention is its scalability, which allows it to handle transmissions across networks of varying sizes and complexities. Whether used in small-scale deployments or large distributed environments, the system's modular architecture ensures efficient operation. The use of WFQ and block interposers enables the system to manage a high volume of concurrent transmissions without compromising performance or security. This scalability makes the invention suitable for applications ranging from personal communications to enterprise-level data transfers.

The invention's ability to process and transmit data in small, manageable units also reduces the computational load on participating systems. By dividing files into byte-sized chunks, the system minimizes the memory and processing requirements for handling each transmission. This lightweight approach allows even resource-constrained devices to participate in secure and efficient data transmissions, expanding the potential use cases for the invention.

The byte-level approach also enhances the efficiency of error detection and correction. Traditional methods often require retransmitting entire files or large data segments when an error is detected. In contrast, this invention isolates and retransmits only the affected bytes, saving time and resources. This targeted approach reduces the overall transmission time and ensures faster recovery from errors, improving the user experience in applications that require high reliability.

The system's use of WFQ to manage transmission priorities provides an additional layer of efficiency and fairness. By assigning appropriate weights to different types of data, the system ensures that critical transmissions are completed promptly, while less critical data is transmitted without undue delay. This prioritization mechanism is particularly valuable in environments with mixed data flows, where some transmissions require immediate attention while others can tolerate slight delays.

The invention's multi-path transmission capabilities also contribute to its robustness and security. By distributing data across multiple paths, the system reduces the risk of a single point of failure and enhances the resilience of the transmission process. The dynamic reassignment of paths for retransmitted bytes further complicates efforts to intercept or manipulate data, making the system highly resistant to attacks.

The modular design of the system allows it to integrate seamlessly with existing network infrastructures and protocols. This compatibility ensures that the invention can be deployed in a wide range of settings without requiring significant changes to existing systems. The modularity also facilitates upgrades and customization, allowing the system to evolve alongside advancements in network technology.

The invention's focus on byte-level granularity, dynamic adaptability, and robust security provides a comprehensive solution for modern data transmission challenges. Its unique combination of WFQ, block interposers, multi-path transmission, and advanced encryption sets it apart from existing methods, delivering unprecedented levels of efficiency, reliability, and security. This innovative approach redefines the possibilities for secure and efficient data transmission in distributed networks.

The third invention introduces a system and method for optimizing data transmission across distributed networks using the innovative Virtual Finishing Timing (VFT) technique combined with Weighted Fair Queueing (WFQ). This invention provides a robust framework for scheduling, prioritizing, and transmitting data packets in a highly efficient and reliable manner. The integration of these techniques allows the system to address the complexities of dynamic network environments by ensuring that packets are transmitted in the most efficient order while maintaining fairness and minimizing delays.

A core aspect of this invention is the use of VFT to calculate an estimated completion time for each data packet. VFT assigns a virtual timestamp to each packet, indicating the time it would complete transmission if it were the only packet in the network. This calculation considers multiple critical factors, including the size of the packet, the priority of the transmission, and the current load on the network. By assigning each packet a specific VFT, the system creates a dynamic scheduling mechanism that optimizes the order of packet transmissions.

WFQ works in tandem with VFT to ensure that packets are managed efficiently within their respective traffic classes. WFQ maintains separate queues for different classes of data based on their assigned priorities. These classes can represent various types of data, such as critical financial transactions, real-time communications, or non-urgent background tasks. Each queue operates independently, with WFQ ensuring that higher-priority queues receive a proportional share of network resources. This separation prevents lower-priority data from starving the transmission of high-priority packets, achieving an equitable balance.

A key feature of the invention is its ability to adapt dynamically to changing network conditions. As network load and resource availability fluctuate, the system recalculates VFTs for all packets and adjusts their transmission schedules accordingly. This adaptability ensures that the system continues to operate efficiently even in high-demand or degraded network scenarios. The dynamic recalibration process accounts for variables such as latency, bandwidth availability, and packet loss, allowing the system to maintain optimal performance under diverse conditions.

The invention also includes mechanisms to ensure the integrity and reliability of transmitted data. By prioritizing packets with smaller VFTs, the system minimizes delays and reduces the likelihood of packet loss during transmission. Additionally, VFT is recalculated for remaining packets after each transmission, ensuring that the schedule remains optimized as conditions evolve. This real-time adaptability enhances the reliability of data transmissions, making the system suitable for applications requiring consistent performance.

The system leverages a hierarchical resource allocation model, where resources are distributed based on the VFT values of packets within their respective queues. This model ensures that packets with the smallest VFTs across all queues are transmitted first, while still maintaining fairness within each class. The hierarchical structure allows for precise control over resource allocation, ensuring that critical data is transmitted promptly without neglecting lower-priority transmissions.

Another inventive feature of the system is its ability to handle complex traffic patterns and mixed data flows. The combination of VFT and WFQ allows the system to manage diverse types of data with varying priorities and resource requirements. For example, real-time video streams can coexist with bulk data transfers and time-sensitive financial transactions, each receiving the appropriate level of attention based on their assigned VFTs and priorities. This flexibility makes the system highly versatile and suitable for a wide range of applications.

The invention's modular architecture enhances its scalability and compatibility with existing network infrastructures. By integrating VFT and WFQ into the system as independent modules, the invention can be easily deployed in networks of varying sizes and complexities. The modularity also facilitates upgrades and customization, enabling the system to evolve in response to advancements in network technology and changing application requirements.

The use of VFT introduces a predictive element to the scheduling process, allowing the system to anticipate transmission outcomes and make informed decisions about packet prioritization. This predictive capability is particularly valuable in scenarios where network conditions are volatile or unpredictable, as it enables the system to maintain consistent performance despite external disruptions. By continuously recalculating VFTs and adjusting schedules, the system ensures that packets are transmitted in the optimal order.

WFQ's role in maintaining separate queues for different traffic classes enhances the system's fairness and efficiency. Each queue operates independently, with resources allocated proportionally based on the assigned weights of the packets. This separation prevents high-priority traffic from being delayed by lower-priority transmissions, while still allowing all classes to make progress. The result is a balanced system that meets the needs of diverse applications and users.

The invention incorporates advanced monitoring capabilities to track the performance of the transmission process in real time. By continuously evaluating metrics such as transmission delays, packet loss rates, and resource utilization, the system can identify potential issues and make adjustments to maintain optimal performance. The monitoring component also provides valuable insights into network behavior, enabling administrators to optimize configurations and address bottlenecks proactively.

Another unique aspect of the invention is its ability to prioritize packets not only based on their assigned weights but also on their importance to the overall transmission process. For example, packets that are part of critical sequences or contain essential control information can be assigned higher priorities, ensuring their timely delivery. This contextual prioritization enhances the system's ability to meet the specific needs of different applications and use cases.

The invention also includes fault-tolerant mechanisms to ensure the continuity of data transmissions in the event of system failures or network disruptions. By recalculating VFTs and redistributing packets among available resources, the system can recover quickly from interruptions and minimize the impact on ongoing transmissions. This resilience makes the system highly reliable and suitable for mission-critical applications.

The system's ability to optimize resource utilization through VFT and WFQ ensures that network bandwidth is used efficiently. By prioritizing packets with smaller VFTs and dynamically adjusting schedules, the system minimizes wasted bandwidth and reduces overall transmission times.

This efficiency translates to lower operational costs and improved user experiences in applications requiring high reliability and low latency.

The combination of VFT's predictive capabilities, WFQ's queue management, and the system's dynamic adaptability creates a powerful framework for optimizing data transmissions. The invention's scalability, reliability, and versatility make it a groundbreaking solution for modern network environments. Its innovative approach to packet scheduling and resource allocation addresses the needs of diverse applications, from real-time communications to large-scale data transfers, redefining the possibilities for efficient and reliable network operations.

In light of the foregoing, the following provides a simplified summary of the present disclosure to offer a basic understanding of its various parts. This summary is not exhaustive, nor does it limit the exemplary aspects of the inventions described herein. It is not designed to identify key or critical elements or steps of the disclosure, nor to define its scope. Rather, it is intended, as understood by a person of ordinary skill in the art, to introduce some concepts of the disclosure in a simplified form as a precursor to the more detailed description that follows. The specification throughout this application contains sufficient written descriptions of the inventions, including exemplary, non-exhaustive, and non-limiting methods and processes for making and using the inventions. These descriptions are presented in full, clear, concise, and exact terms to enable skilled artisans to make and use the inventions without undue experimentation, and they delineate the best mode contemplated for carrying out the inventions.

In a first aspect, in some arrangements, a method for registering distributed systems and dynamically allocating resources in a network includes registering, by a registration server, a plurality of distributed systems, where each distributed system is associated with system-specific parameters, including an Internet Protocol (IP) address, a Media Access Control (MAC) address, and a system identifier. The method involves generating, by the registration server, a unique Whisper System Identifier (WSID) for each distributed system based on a cryptographic hash function that combines the system-specific parameters. The method further includes calculating, by a code processing capacity (CPC) evaluator on the registration server, a CPC value for each distributed system based on its available memory and processor capabilities. The WSIDs and corresponding CPC values are stored in a registration pool managed by a registration pool module. The method also includes receiving a resource allocation request, selecting a distributed system with sufficient CPC value, and assigning a task to the selected system while updating the CPC values in the registration pool.

In some arrangements, generating the unique Whisper System Identifier (WSID) further comprises applying a cryptographic salt to the hash function to enhance the security and unpredictability of the WSID.

In some arrangements, the cryptographic salt used in generating the WSID is dynamically generated based on a timestamp and a system-specific secret key associated with each distributed system.

In some arrangements, the registration server validates the uniqueness of the WSID by comparing the generated WSID with existing WSIDs in the registration pool before storing it.

In some arrangements, calculating the code processing capacity (CPC) value further comprises assigning a weight to each parameter based on its contribution to processing efficiency, wherein the weight for processor capabilities is greater than the weight for available memory.

In some arrangements, the CPC evaluator dynamically updates the CPC values of distributed systems in the registration pool based on periodic monitoring of their operational states.

In some arrangements, the task allocation module prioritizes the selection of distributed systems in the registration pool based on their proximity to the initiating system, as determined by their Internet Protocol (IP) address.

In some arrangements, the task allocation module dynamically reallocates tasks among distributed systems in the registration pool in response to changes in network load or system failures.

In some arrangements, the registration pool module maintains a fault tolerance mechanism by identifying alternate distributed systems with sufficient CPC values for reallocation in the event of a failure of the selected distributed system.

In some arrangements, the registration server provides real-time monitoring and reporting of the CPC values, WSIDs, and task assignments of all distributed systems in the registration pool to ensure efficient resource allocation across the network.

In some arrangements, a method for registering distributed systems, securely transmitting data at a byte level, and optimizing data transmission in a network includes registering, by a registration server, a plurality of distributed systems, where each distributed system is associated with system-specific parameters including an Internet Protocol (IP) address, a Media Access Control (MAC) address, and a system identifier. The method involves generating, by the registration server, a unique Whisper System Identifier (WSID) for each distributed system using a cryptographic hash function that combines the system-specific parameters with a dynamically generated cryptographic salt, validating the WSID, and storing it in a registration pool along with CPC values for resource management. Additionally, the method includes segmenting files into byte-sized units for transmission, assigning priority weights through Weighted Fair Queueing (WFQ), calculating virtual finishing times, transmitting byte-sized units, validating their integrity, retransmitting corrupted units, and dynamically recalibrating schedules based on real-time network conditions.

In some arrangements, a system for registering distributed systems and dynamically allocating resources in a network includes a registration server configured to generate and validate unique WSIDs, a CPC evaluation module for resource assessment, a registration pool for task assignment, and a reporting module to ensure real-time monitoring, task reallocation, and efficient resource management.

In some arrangements, the WSID generation module is further configured to include a cryptographic nonce in the cryptographic salt to prevent replay attacks during the generation of the Whisper System Identifier.

In some arrangements, the validation module is further configured to generate an alert if a generated WSID matches an existing WSID in the registration pool, indicating a potential conflict or unauthorized duplication.

In some arrangements, the registration pool module is further configured to maintain a timestamp for each WSID to track the registration and operational status of the corresponding distributed system.

In some arrangements, the CPC evaluation module dynamically adjusts the weight assigned to processor capabilities and memory based on historical performance data collected by the monitoring module.

In some arrangements, the monitoring module is further configured to assess the network latency and bandwidth associated with each distributed system, incorporating these metrics into the periodic updates of the CPC values.

In some arrangements, the task allocation module is further configured to prioritize distributed systems based on their proximity to the source of the data transmission task, as determined by a comparison of Internet Protocol (IP) address prefixes.

In some arrangements, the reporting module is further configured to generate and transmit alerts to an administrator when the available CPC of any distributed system in the registration pool falls below a predefined threshold.

In some arrangements, the reporting module includes limitations covering all three inventions, where the reporting module aggregates WSID registration statuses, CPC metrics, transmission statuses, retransmission data, and validation success rates to generate consolidated performance reports. The reports include recommendations for optimizing scheduling, resource allocation, and transmission strategies across the network, informed by predictive analytics and real-time operational data.

In a second aspect, in some arrangements, a method for secure byte-level file transmission across a distributed network includes segmenting, by a segmentation module on a transmitting system, a file into a plurality of byte-sized units, wherein each byte-sized unit is assigned a unique identifier comprising a string code and a sequence number. The method further involves scheduling, by a Weighted Fair Queueing (WFQ) module on the transmitting system, the transmission of the byte-sized units based on assigned priority weights corresponding to the criticality of each byte-sized unit. It includes transmitting the byte-sized units to at least one distributed system in the order determined by the WFQ module, validating the integrity of each byte-sized unit using a block interposer, retransmitting corrupted units through alternate paths, and reassembling the received byte-sized units into their original sequence at the receiving system.

In some arrangements, the unique identifier assigned to each byte-sized unit by the segmentation module further comprises a timestamp to track the transmission time of the byte-sized unit.

In some arrangements, the WFQ module dynamically adjusts the priority weights assigned to the byte-sized units based on network conditions, including bandwidth availability and latency.

In some arrangements, the block interposer further performs an encryption integrity check by verifying that each byte-sized unit has been transmitted with its associated cryptographic key.

In some arrangements, the alternate path selected by the distributed system for retransmission is determined based on a combination of geographic proximity and network reliability metrics.

In some arrangements, the receiving module includes a preliminary validation step to discard any byte-sized units received from unauthorized sources before they are stored in the reassembly buffer.

In some arrangements, the byte collector is configured to detect and correct errors in the sequence numbers of received byte-sized units by referencing a predefined transmission order.

In some arrangements, the reassembly buffer includes a time-based expulsion mechanism to remove unvalidated or incomplete byte-sized units after a predefined time period.

In some arrangements, the transmitting system includes a feedback module configured to notify the WFQ module of retransmission requests to update scheduling priorities dynamically.

In some arrangements, the receiving system generates a detailed transmission log after reassembly, wherein the log includes metrics such as the number of retransmissions, validation failures, and transmission times for each byte-sized unit.

In some arrangements, a method for secure and efficient byte-level file transmission across a distributed network combines the segmentation of files into byte-sized units, assignment of unique identifiers with timestamps, dynamic scheduling using Weighted Fair Queueing (WFQ), validation using a block interposer, retransmission through optimized paths, real-time monitoring of network conditions, and detailed logging of transmission metrics.

In some arrangements, a system for secure and efficient byte-level file transmission across a distributed network includes a segmentation module, a WFQ module for scheduling, a transmitting module for data transfer, a block interposer for validation, a retransmission module for alternate path routing, and a byte collector for reassembly. These components work together to ensure integrity, reliability, and efficiency in data transmission.

In some arrangements, the segmentation module is further configured to compress each byte-sized unit before assigning the unique identifier to reduce the overall file size during transmission.

In some arrangements, the WFQ module is further configured to prioritize byte-sized units containing critical control information over those containing non-critical data by assigning higher priority weights to the control information units.

In some arrangements, the block interposer is further configured to perform deep packet inspection on each byte-sized unit to detect potential security threats, including malicious payloads or unauthorized alterations.

In some arrangements, the retransmission module dynamically selects alternate paths for retransmitting corrupted byte-sized units based on real-time network performance metrics, including latency and packet loss rates.

In some arrangements, the receiving module is further configured to calculate and store a trust score for each distributed system based on the validation success rate of byte-sized units received from that system.

In some arrangements, the byte collector is further configured to generate error correction codes for byte-sized units flagged as corrupted, enabling reconstruction of the original file without requiring retransmission of the flagged units.

In some arrangements, the logging module on the receiving system generates and transmits periodic summary reports to an administrator, wherein the reports include aggregated metrics for system-wide transmission performance and recommendations for optimizing future transmissions.

In some arrangements, the system includes limitations covering all three inventions, wherein the reporting module aggregates WSID statuses, CPC values, transmission performance data, retransmission metrics, and validation success rates. The reporting module generates consolidated reports that provide recommendations for optimizing scheduling, resource allocation, and transmission strategies. These recommendations leverage predictive analytics, real-time operational data, and network-wide metrics to enhance the performance and security of distributed systems.

In a third aspect, in some arrangements, a method for optimizing data transmission across a distributed network using virtual finishing timing and weighted fair queueing includes receiving, by a transmitting system, a plurality of data packets for transmission, wherein each data packet is associated with a priority weight and a packet size. The method further involves calculating, by a Virtual Finishing Timing (VFT) module, a virtual finishing time for each data packet based on the packet size, the priority weight, and the current network load. Scheduling is performed by a Weighted Fair Queueing (WFQ) module based on the calculated virtual finishing times, prioritizing data packets with smaller virtual finishing times. The method includes transmitting the data packets in the order determined by the WFQ module, validating the integrity of each received packet, retransmitting corrupted packets through alternate paths, and dynamically updating the virtual finishing times of remaining packets based on real-time network conditions.

In some arrangements, the virtual finishing time for each data packet is further calculated by incorporating an estimated transmission delay based on the current congestion level of the network.

In some arrangements, the WFQ module maintains separate queues for different traffic classes, and the priority weights of the data packets within each queue are adjusted dynamically based on the real-time bandwidth utilization of the network.

In some arrangements, the transmitting system uses a predictive algorithm to forecast future network conditions and preemptively recalibrates the virtual finishing times of all queued data packets to minimize transmission delays.

In some arrangements, the retransmission of corrupted data packets is performed using a multi-path transmission strategy, wherein alternate paths are selected based on metrics including latency, packet loss rates, and geographic proximity to the receiving system.

In some arrangements, the receiving system provides a real-time feedback loop to the transmitting system, wherein the feedback includes packet-level performance data such as validation success rates, latency measurements, and out-of-order delivery metrics.

In some arrangements, the WFQ module dynamically reallocates bandwidth among traffic classes in response to the feedback from the receiving system to prioritize critical transmissions while maintaining overall fairness.

In some arrangements, the network monitoring module on the transmitting system identifies and flags network anomalies, such as sudden increases in latency or bandwidth depletion, and notifies the VFT module to adjust the virtual finishing times of all queued data packets accordingly.

In some arrangements, the reporting module on the transmitting system aggregates packet-level metrics, including transmission time, retransmission count, and validation success rate, into a summary report for review by a network administrator.

In some arrangements, the summary report generated by the reporting module includes recommendations for optimizing future data transmissions, including adjustments to traffic class prioritization, retransmission strategies, and resource allocation across the network.

In some arrangements, a method for registering distributed systems, securely transmitting data at a byte level, and optimizing data transmission in a distributed network includes registering systems with unique Whisper System Identifiers (WSIDs), calculating and managing resource capacities using CPC evaluation, segmenting files into byte-sized units, scheduling transmissions with WFQ, calculating virtual finishing times, validating packet integrity, retransmitting corrupted data, dynamically updating schedules, and generating detailed performance reports.

In some arrangements, a system for optimizing data transmission across a distributed network includes a transmitting system for scheduling and transmitting data packets, a Virtual Finishing Timing (VFT) module for calculating transmission order, a Weighted Fair Queueing (WFQ) module for prioritizing data classes, a network monitoring module for real-time condition assessment, and a reporting module for analyzing and recommending network optimizations.

In some arrangements, the Virtual Finishing Timing (VFT) module further incorporates an estimated transmission delay into the virtual finishing time calculation based on real-time congestion metrics from the network monitoring module.

In some arrangements, the WFQ module dynamically reallocates bandwidth among traffic classes in response to feedback received from the receiving system, prioritizing critical data packets with higher priority weights.

In some arrangements, the retransmission module uses a predictive algorithm to select alternate paths for retransmission, wherein the prediction is based on historical network reliability data and geographic proximity to the receiving system.

In some arrangements, the validation module on the receiving system performs deep packet inspection to identify and discard data packets containing unauthorized or malicious content before further processing.

In some arrangements, the network monitoring module identifies and flags network anomalies, including sudden spikes in latency or bandwidth depletion, and notifies the VFT module to adjust the virtual finishing times of all queued data packets accordingly.

In some arrangements, the reporting module aggregates packet-level metrics, including the number of retransmissions, average transmission times, and packet loss rates, into a detailed transmission performance summary for review by a network administrator.

In some arrangements, the summary generation module includes recommendations in the performance report for optimizing resource allocation and scheduling across the network, wherein the recommendations include specific adjustments to the VFT calculation parameters and WFQ scheduling priorities for future transmissions.

In some arrangements, the system includes limitations covering all three inventions, wherein the reporting module aggregates WSID statuses, CPC values, transmission performance data, retransmission metrics, and validation success rates to generate consolidated reports. The reports provide recommendations for optimizing scheduling, resource allocation, and transmission strategies. These recommendations leverage predictive analytics, real-time operational data, and network-wide metrics to enhance the performance, scalability, and security of distributed systems.

The following description and claims, in conjunction with the drawings-all integral parts of this specification-will clarify various features and characteristics of the current technology. Like reference numerals in the figures correspond to similar parts, enhancing understanding of the technology's methods of operation and the functions of related structural elements, as well as the synergies and economies of their combinations. Some of the processes or procedures described here may be implemented, in whole or in part, as computer-executable instructions recorded on computer-readable media, configured as computer modules, or in other computer constructs. These steps and functionalities may be executed on a single device or distributed across multiple devices interconnected with one another. However, it is important to acknowledge that the drawings primarily serve for descriptive and illustrative purposes and are not intended to delineate the limits of the invention. Unless contextually evident, the singular forms of "a," "an," and "the" used throughout the specification and claims should be interpreted to include their plural counterparts.

BRIEF DESCRIPTION OF DRAWINGS

FIG. 1 is an exemplary system architecture diagram in accordance with one or more embodiments disclosed herein that illustrates the registration of distributed systems, dynamic resource allocation, secure data transmission, and network performance optimization. The diagram includes modules for generating and validating unique identifiers, segmenting and scheduling data transmissions, validating data integrity, monitoring network conditions, and generating reports with optimization recommendations.

FIG. 2 is an exemplary flow diagram in accordance with one or more embodiments disclosed herein that illustrates the processes for registering distributed systems, managing resources dynamically, and securely transmitting data at the byte level. The diagram further demonstrates the optimization of data transmission through innovative scheduling, validation, and feedback mechanisms, ensuring efficient and reliable operations in a distributed network.

FIG. 3 is an exemplary sequence diagram in accordance with one or more embodiments disclosed herein for a technical solution algorithm that illustrates the interactions between distributed systems, senders, receivers, and network components for system registration, resource management, and secure data transmission. The diagram further demonstrates processes for BCODE validation, retransmission, file reconstruction, and real-time performance optimization to ensure reliable and efficient operations within a distributed network.

FIG. 4 is an exemplary flow diagram in accordance with one or more embodiments disclosed herein that illustrates the registration algorithm for distributed systems, senders, and receivers within a network. The diagram details the steps for client installation, WSID acquisition, CPC calculation, and WID generation to ensure unique identification, resource evaluation, and integration into the network.

FIG. 5 is an exemplary flow diagram in accordance with one or more embodiments disclosed herein that illustrates the data or file sending algorithm, showcasing the process of establishing a connection, segmenting files into byte-sized units, and assigning unique codes to each byte. The diagram further demonstrates the scheduling and prioritization of these bytes by the Weighted Fair Queueing (WFQ) system to ensure secure, reliable, and efficient data transmission across the network.

FIG. 6 is an exemplary flow diagram in accordance with one or more embodiments disclosed herein that illustrates the transmission algorithm using a WFQ-enabled Distributed ConnecLink system. The diagram details the systematic processes of byte selection, validation, chaining, scheduling, and reassembly, ensuring secure, efficient, and reliable data transmission within a distributed network.

FIG. 7 is an exemplary process flow diagram in accordance with one or more embodiments disclosed herein that illustrates the secure and efficient data transmission workflow using Whisper Identifiers (WIDs) and Virtual Finishing Time (VFT) scheduling. The diagram highlights key steps, including computational resource analysis, dynamic scheduling through Weighted Fair Queueing (WFQ), and the generation of secure identifiers to enable encrypted and optimized communication within the system.

FIG. 8 is an exemplary process flow diagram in accordance with one or more embodiments disclosed herein that illustrates the workflow for analyzing data bits, managing file associations, and allocating computational resources. The diagram highlights steps such as classifying bytes with the Bits Analyzer, creating or associating files in the file pool, and dynamically managing resources to ensure efficient and secure data processing within distributed systems.

FIG. 9 is an exemplary block diagram in accordance with one or more embodiments disclosed herein that illustrates the workflow for processing requests, managing binary data, and validating bits within a distributed system. The diagram highlights key components, including the BCODE table, WFQ-integrated Code Assignment Tab, ConnecLink, and Block Interposer, showcasing a systematic approach to ensuring secure, efficient, and validated data transmission.

DETAILED DESCRIPTION

A first aspect of the invention is a system and method designed to register distributed systems and dynamically allocate resources in a network, focusing on efficiency, fault tolerance, and scalability. A key element of the invention is the Whisper System Identifier (WSID), a unique identifier assigned to each distributed system. The WSID is generated using a cryptographic hash function that combines system-specific parameters, such as the Internet Protocol (IP) address, Media Access Control (MAC) address, and a system identifier. To further ensure uniqueness and security, the hash function includes a dynamically generated cryptographic salt, derived from timestamps and system-specific secret keys. This approach ensures that WSIDs cannot be duplicated or tampered with, and each WSID undergoes a validation process to verify its uniqueness before being stored in the registration pool.

The registration pool acts as a central repository for managing registered systems and their associated data, including resource availability metrics. Each registered system is evaluated for its Code Processing Capacity (CPC), a value calculated based on available memory, processor capabilities, and real-time operational states. The CPC evaluation module assigns greater weight to processor capabilities than to memory, reflecting their relative impact on task execution. These CPC values are dynamically updated through periodic monitoring to account for changes in system performance or workload. The registration pool not only tracks CPC values but also maintains a historical log of system performance, enabling administrators to identify trends and make informed decisions about network optimization.

The task allocation module plays a pivotal role in ensuring efficient resource utilization. When a task is requested, the module selects a distributed system from the registration pool with sufficient CPC to handle the workload. The selection process is adaptive, considering factors such as proximity to the initiating system, task priority, and real-time network conditions. The task allocation module also includes a fault tolerance mechanism, which identifies alternate systems for task reassignment in case of failures or significant changes in CPC values. This ensures continuous operation of the network even in adverse conditions.

The invention also includes a monitoring module that continuously evaluates system performance and network conditions. This module detects anomalies such as high latency, bandwidth depletion, or resource overload, and generates alerts to prevent potential disruptions. Complementing this is a reporting module that provides real-time insights into WSID statuses, CPC values, task assignments, and overall network performance. The reports include recommendations for optimizing resource allocation and resolving bottlenecks, ensuring the network operates at peak efficiency.

A second aspect of the invention focuses on secure and efficient byte-level file transmission across distributed networks. It introduces a novel method of dividing files into byte-sized units, known as BCODEs, where each unit is uniquely identified by a combination of a string code, sequence number, and timestamp. The segmentation process enables granular handling of data, facilitating precise tracking and validation of each unit during transmission. This granularity is especially valuable in environments where data integrity and real-time performance are critical.

The Weighted Fair Queueing (WFQ) module schedules the transmission of BCODES, assigning priority weights based on the criticality of each unit and network conditions such as bandwidth and latency. The WFQ module dynamically adjusts these priorities in response to feedback from the receiving system, ensuring that critical data is prioritized without compromising fairness. Each BCODE is validated by a block interposer, which compares its hash value with an expected value and verifies encryption integrity. If a BCODE is identified as corrupted, it is retransmitted through an alternate path selected based on metrics such as latency, packet loss rates, and geographic proximity.

The receiving system includes a byte collector and a reassembly buffer, which work together to validate, store, and reconstruct the transmitted BCODEs into their original sequence. The byte collector detects and corrects errors in sequence numbers using a predefined transmission order and applies error correction codes to recover missing data. The reassembly buffer features a time-based expulsion mechanism to remove incomplete or unvalidated BCODEs, optimizing resource usage and maintaining system efficiency.

The second invention also supports detailed logging of transmission metrics, including the number of retransmissions, validation failures, and transmission times. These metrics are aggregated into performance reports that inform network optimization strategies. The system can integrate advanced encryption protocols and deep packet inspection to enhance security, protecting against unauthorized access and malicious data alterations.

A third aspect of the invention addresses data transmission optimization in distributed networks using Virtual Finishing Timing (VFT) and Weighted Fair Queueing (WFQ). VFT assigns a virtual finishing time to each data packet, calculated based on the packet size, priority weight, and current network load. This approach introduces a predictive element to scheduling, ensuring that packets with smaller finishing times are prioritized for transmission. The WFQ module complements VFT by managing separate queues for different traffic classes and dynamically reallocating bandwidth based on real-time network conditions.

The VFT module continuously recalibrates the finishing times of remaining packets as network conditions evolve, ensuring that the transmission schedule remains optimal. This dynamic adaptability is further enhanced by a feedback loop between the transmitting and receiving systems, which provides real-time data on validation success rates, latency, and packet loss. The retransmission module identifies corrupted packets and sends them through alternate paths chosen based on network reliability metrics, reducing delays and ensuring data integrity.

The network monitoring module continuously evaluates performance metrics such as bandwidth utilization, latency, and packet delays. When anomalies are detected, such as sudden increases in latency or bandwidth depletion, the module notifies the VFT and WFQ modules to adjust their calculations and scheduling strategies. A reporting module aggregates these metrics into detailed transmission performance summaries, which include recommendations for optimizing resource allocation and scheduling. These recommendations leverage historical performance trends and predictive analytics to enhance future transmissions.

All three inventions can operate independently or as an integrated system, offering a comprehensive solution for network management, data transmission security, and performance optimization. The modular architecture of these inventions ensures scalability and compatibility with diverse network environments, making them adaptable to a wide range of applications, including real-time communications, financial transactions, and large-scale data transfers. By addressing the challenges of system registration, resource allocation, data segmentation, validation, scheduling, and monitoring, these inventions redefine the capabilities and reliability of distributed networks.

The description of various example embodiments herein is intended to achieve the goals previously outlined, referencing the illustrations included in this disclosure. These illustrations depict multiple systems and methods for implementing the disclosed information. It should be recognized that alternative implementations are possible, and modifications to both structure and functionality may be made. The description details various connections between elements, which should be interpreted broadly. Unless explicitly stated otherwise, these connections can be either direct or indirect and may be established through either wired or wireless methods. This document does not aim to restrict the nature of these connections.

In various configurations, terms such as "computers" and "machines" refer to devices that may be general-purpose or specialized for specific tasks, whether physical or virtual, and capable of network connectivity. These devices encompass all necessary hardware, software, and components known to skilled practitioners, including application-specific integrated circuits (ASICs), microprocessors, cores, or other processing units. These components execute, control, or implement various types of software, instructions, data, modules, processes, or routines. The terms used do not restrict the device type and should be broadly interpreted. Software, data, and executable code can reside on various physical, computer-readable storage devices, such as local memory, cloud-based storage, or network-attached storage. These can be stored in both volatile and non-volatile memory and may function autonomously or respond to specific triggers. These elements can be consolidated or distributed across multiple devices and stored in accessible memory systems such as distributed databases, big data infrastructures, blockchains, or distributed ledgers.

Networks and similar references refer to a broad range of communication systems, from local area networks (LANs) and wide area networks (WANs) to the Internet and cloud-based networks, supporting wired and wireless configurations. Specialized networks like digital subscriber line (DSL), frame relay, asynchronous transfer mode (ATM), and virtual private networks (VPN) are included. These networks utilize various hardware and software components, including modems, routers, firewalls, switches, and adapters, to facilitate communication. Networks are also equipped with virtual IP addresses and support multiple protocols like HTTPS, enabling effective packet-based data transmission and communication.

Generative Artificial Intelligence (AI) refers to AI techniques that learn from training data and generate new content, such as text, code, images, and audio. Generative AI systems, often powered by large language models (LLMs) like GPT-3, GPT-4, Meta LLaMA, and others, can be deployed through APIs, search engines, or chatbots. These models, which may be proprietary or open source, leverage deep learning methods and are generally governed by enterprise policies regarding AI and risk. Models such as BERT, T5, AlphaFold, Watson, Megatron, and others play a role in generating or interpreting language and content for various applications.

Generative AI and LLMs are utilized throughout this disclosure for tasks including natural language processing, data analysis, real-time processing, software development, and creative content generation. Specific functions include trend analysis, data classification, sentiment analysis, writing assistance, language translation, and decision-making support. These models enable capabilities like feedback learning, context determination, and comprehensive search operations, improving performance through iterative learning and feedback from human or system interactions. The wide range of applications supported by generative AI makes these systems a powerful tool in generating, analyzing, and managing information across diverse fields. All configurations and uses of these models are within the scope of this disclosure.

FIG. 1 depicts an exemplary system architecture designed to manage the registration of distributed systems, dynamically allocate resources, securely transmit data at a byte level, and optimize data transmission through innovative scheduling and validation techniques. The system architecture is modular and integrates numerous specialized components, each uniquely numbered to reflect its specific functionality and role within the architecture. At the core of the system is the Registration Server (100), which acts as the central hub for registering distributed systems and maintaining real-time information about their resources and capabilities. This server includes several essential modules, beginning with the WSID Generation Module (102), which generates unique Whisper System Identifiers (WSIDs) for each distributed system. The WSIDs are produced using a cryptographic hash function that combines critical system parameters, such as the Internet Protocol (IP) address, Media Access Control (MAC) address, and a unique system identifier. To ensure that these WSIDs are secure and unpredictable, the system incorporates a dynamically generated cryptographic salt based on timestamps and system-specific secret keys. The generated WSIDs are validated by a Validation Module (104), which ensures that each WSID is unique by comparing it with existing WSIDs stored in the Registration Pool Module (106). The registration pool maintains a repository for all registered systems and their associated WSIDs, along with system-specific parameters and resource availability metrics.

Among these metrics is the Code Processing Capacity (CPC), a value calculated by the CPC Evaluation Module (108). The CPC is determined by analyzing each distributed system's available memory and processor capabilities, with weights assigned to reflect the relative importance of these factors. The Monitoring Module (110) dynamically updates the CPC values by observing real-time operational states, such as system load and performance. This ensures that the Registration Pool Module (106) always contains accurate and up-to-date information. The Task Allocation Module (112) is responsible for assigning tasks to distributed systems based on their CPC values and proximity to the initiating system. This module dynamically reallocates tasks if a system becomes unavailable or if network conditions change, ensuring uninterrupted operation. To provide real-time insights into the status of the network, the Reporting Module (114) generates comprehensive reports that include WSID statuses, CPC values, task assignments, and performance metrics, offering actionable recommendations for optimizing network resources and configurations.

The Transmitting System (116) is responsible for preparing data for transmission. The process begins with the Segmentation Module (118), which divides files into byte-sized units known as BCODEs. Each BCODE is assigned a unique identifier consisting of a string code, sequence number, and timestamp, allowing for granular tracking and validation during transmission. The Weighted Fair Queueing (WFQ) Module (120) schedules the transmission of BCODEs, assigning priority weights based on their criticality and network conditions such as bandwidth utilization and latency. To further enhance scheduling efficiency, the Virtual Finishing Timing (VFT) Module (122) calculates a virtual finishing time for each BCODE, taking into account its size, priority weight, and the current network load. These finishing times are dynamically recalibrated as network conditions evolve, ensuring that the transmission schedule remains optimized. The Transmitting Module (124) sends BCODEs in the order determined by the WFQ module, while the Feedback Module (126) communicates with the Receiving System (134) to adjust scheduling priorities in real-time based on metrics such as latency and retransmission requests.

If a BCODE is found to be corrupted during transmission, the Retransmission Module (128) selects an alternate path for retransmission. This path is determined dynamically based on network reliability metrics, such as latency, packet loss rates, and geographic proximity. The Distributed System (130) receiving the data includes a Block Interposer (132), which validates the integrity of each BCODE by comparing its hash value with an expected value and verifying encryption integrity. This validation process ensures that only authentic, unaltered data reaches the Receiving System (134).

The Receiving System (134) plays a critical role in validating, storing, and reconstructing transmitted BCODEs. The Receiving Module (136) temporarily stores BCODEs in a Reassembly Buffer (140) after initial validation. The Byte Collector (138) validates and reassembles the BCODEs into their original sequence using their unique identifiers and a predefined transmission order. Errors in sequence numbers are corrected, and incomplete or unvalidated BCODEs are removed by the Reassembly Buffer (140), which includes a time-based expulsion mechanism. To ensure traceability and compliance, the Logging Module (142) maintains a detailed audit trail, including timestamps, validation results, and retransmission counts. The Performance Reporting Module (144) aggregates this data into reports that offer insights into transmission efficiency and recommendations for optimizing future transmissions.

The system architecture also includes a Network Monitoring Module (146), which continuously evaluates network performance metrics such as bandwidth utilization, latency, and packet delays. When anomalies are detected, the Anomaly Detection Module (148) flags these issues and notifies relevant components, such as the WFQ and VFT modules, to adjust their calculations and scheduling priorities. The Consolidated Reporting Module (150) combines data from all systems, including WSID statuses, CPC metrics, retransmission data, and validation success rates, into detailed reports. These reports are further analyzed by the Optimization Recommendation Module (152), which uses predictive analytics to suggest improvements in scheduling, resource allocation, and overall network performance.

To enhance data security, the system incorporates a Data Encryption Module (154) that applies end-to-end encryption to BCODEs, ensuring their confidentiality during transmission. A Deep Packet Inspection Module (156) examines BCODEs for unauthorized content or malicious payloads, discarding invalid data as necessary. A Real-Time Feedback Loop (158) enables continuous communication between the Transmitting System (116) and the Receiving System (134), allowing for dynamic updates to scheduling, retransmission processes, and other optimizations. Finally, the System Administrator Interface (160) provides administrators with real-time dashboards, detailed performance reports, and tools for implementing system-generated recommendations. This comprehensive architecture integrates advanced registration, resource management, data segmentation, scheduling, and security functionalities to create an efficient, scalable, and reliable distributed network.

FIG. 2 is an exemplary flow diagram that intricately details the processes for the first, second, and third inventions, highlighting their interdependent functionalities and the key steps involved in achieving secure, efficient, and optimized operations within a distributed network. The flow begins with a distributed system initiating a request for registration (200). Upon receiving this request, the system-specific parameters, such as the Internet Protocol (IP) address, Media Access Control (MAC) address, and a unique system identifier, are extracted from the requesting system (202). These parameters are integral to uniquely identifying the system within the network and form the foundation for the Whisper System Identifier (WSID). The WSID is generated through a cryptographic hash function that combines the extracted parameters with a cryptographic salt (204). This salt is dynamically created using a timestamp and a secret key unique to the system, ensuring that the WSID is both secure and unique.

Once the WSID is generated, it undergoes a validation process where it is compared against existing WSIDs stored in the registration pool (206). This step ensures that there are no duplicates, which could compromise system identification or create conflicts during resource allocation. If the WSID passes the validation, it is stored in the registration pool along with the associated system-specific parameters (208). The registration server then calculates the Code Processing Capacity (CPC) for the distributed system (210). This calculation evaluates the system's available memory and processor capabilities, assigning weighted values to these parameters to prioritize processing power, which is often the most critical resource in distributed operations. The CPC values are dynamically updated by the monitoring module, which continuously observes the real-time operational state of each system (212). This ensures that the registration pool always contains accurate, up-to-date information about resource availability.

When a task allocation request is received, specifying the required CPC for execution (214), the task allocation module identifies an appropriate distributed system from the registration pool (216). The selection is based on whether the system's CPC value meets or exceeds the requirements specified in the task request. Additionally, the module considers the system's geographic proximity to the task origin to minimize latency and improve overall efficiency. After selecting a suitable system, the task is assigned (218), and the CPC value of the selected system is updated in the registration pool to reflect the additional workload. The task allocation module also includes a dynamic reassignment mechanism that reallocates tasks to alternate systems if the original system fails or if network conditions change significantly (220). This ensures the uninterrupted execution of tasks and maintains the reliability of the network.

The flow transitions into the processes of the second invention, which focuses on the secure transmission of data. This begins with the segmentation of a file into byte-sized units called BCODEs (222). Each BCODE is assigned a unique identifier consisting of a string code, sequence number, and timestamp (224). These identifiers allow for precise tracking and validation of data throughout the transmission process. The Weighted Fair Queueing (WFQ) module schedules the transmission of BCODEs based on their priority weights, which are determined by the criticality of the data and current network conditions, such as bandwidth availability and latency (226). The Virtual Finishing Timing (VFT) module calculates a virtual finishing time for each BCODE, factoring in its size, priority weight, and network load (228). This calculated time is used to optimize the order in which BCODEs are transmitted. As network conditions change, the VFT module recalibrates the finishing times of remaining BCODEs to maintain an efficient transmission schedule (230).

The transmitting module sends BCODEs in the order determined by the WFQ module (232). During this process, the integrity of each BCODE is validated by a block interposer located on the distributed system (234). Validation involves comparing the hash value of each BCODE with its expected value and verifying its encryption integrity. If a BCODE is found to be corrupted, the retransmission module selects an alternate transmission path (236). This path is determined dynamically based on reliability metrics such as latency, packet loss rates, and geographic proximity to the receiving system. This multi-path retransmission strategy ensures the secure and reliable delivery of data.

When BCODEs arrive at the receiving system, they undergo preliminary validation to filter out unauthorized or tampered units (238). Valid BCODEs are then stored in a reassembly buffer, where they await reconstruction (240). The byte collector validates and reassembles the BCODEs into their original sequence by referencing their unique identifiers and correcting any errors in sequence numbers (242). The reassembly buffer includes a time-based expulsion mechanism to remove incomplete or unvalidated BCODEs after a predefined period (244), optimizing resource usage and maintaining the efficiency of the receiving system. Once reassembly is complete, the file is restored to its original format and stored at the receiving system (246).

The final stages of the flow focus on monitoring, reporting, and optimization, as outlined in the third invention. Detailed logs are generated for each transmission, capturing metrics such as retransmission counts, validation success rates, and average transmission times (248). These logs are analyzed by the network monitoring module, which evaluates real-time performance metrics, including bandwidth utilization, latency, and packet delays (250). If anomalies are detected, such as sudden increases in latency or bandwidth depletion, the anomaly detection module flags these issues and notifies the relevant components to initiate corrective actions (252). For example, the VFT and WFQ modules may adjust their calculations and schedules to accommodate the changes in network conditions.

The data collected during transmissions is aggregated by the consolidated reporting module, which combines WSID statuses, CPC values, transmission performance data, retransmission metrics, and validation success rates into a comprehensive report (254). This report is analyzed by the optimization recommendation module, which uses predictive analytics to generate actionable suggestions for improving scheduling, resource allocation, and retransmission strategies (256). Real-time feedback is provided to administrators through a system administrator interface, which includes dashboards and detailed reports (258). These tools empower administrators to make informed decisions and implement optimizations that enhance the overall performance, reliability, and security of the network. The flow illustrated in FIG. 2 represents a seamless integration of the processes, functionalities, and innovations described in the first, second, and third inventions, offering a robust and scalable solution for modern distributed network operations.

FIG. 3 is an exemplary sequence diagram for a technical solution algorithm that illustrates the detailed interactions between various actors in the system for managing distributed systems, dynamically allocating resources, securely transmitting data, and optimizing the overall network. The sequence begins with the Distributed System installing the respective client software and initiating the registration process with the WIDS Pool to join the network (300). Upon receiving the request, the WIDS Pool extracts the system-specific parameters, such as the Internet Protocol (IP) address, Media Access Control (MAC) address, and unique system identifier, to generate a Whisper System Identifier (WSID) (302). The WSID is generated using a cryptographic hash function combined with a dynamically generated cryptographic salt, ensuring its uniqueness and security. The WIDS Pool validates the WSID by comparing it with existing WSIDs and, upon successful validation, stores the WSID along with the distributed system's Code Processing Capacity (CPC) value, which is calculated based on the system's available memory and processor capabilities (304).

Once the registration is complete, the Sender connects to the WIDS Pool, retrieves its WSID, and confirms its status as a registered entity in the network (306). The Sender then selects the file it intends to transmit and initiates the segmentation process, where the file is divided into byte-sized units called BCODEs (308). Each BCODE is assigned a unique identifier comprising a string code, sequence number, and timestamp to enable precise tracking and validation during transmission (310). The WFQ Scheduler evaluates the BCODEs and assigns priority weights to each based on their criticality and current network conditions such as bandwidth and latency. This ensures that high-priority BCODEs are transmitted first while maintaining fairness across traffic classes (312).

The VFT Controller calculates a virtual finishing time for each BCODE, incorporating its size, priority weight, and network load. These finishing times are used to optimize the transmission schedule, ensuring that BCODEs with smaller finishing times are prioritized. As the transmission progresses, the VFT Controller dynamically recalibrates the finishing times of remaining BCODEs based on real-time performance metrics to adapt to changing network conditions (314). The Sender transmits the BCODEs to the Receiver in the order determined by the WFQ Scheduler, ensuring efficient and prioritized delivery (316).

Upon receiving the BCODEs, the Block Interposer validates their integrity by comparing their hash values with expected values and verifying their encryption integrity (318). If any BCODE fails validation, it is flagged as corrupted, removed from the transmission stream, and a retransmission request is sent back to the Sender. The Sender retransmits the corrupted BCODE through an alternate path determined dynamically based on metrics such as latency, packet loss rates, and geographic proximity to the Receiver. The retransmitted BCODE undergoes validation again by the Block Interposer (320). Valid BCODEs are forwarded to the Code Collector, which temporarily stores them in preparation for reassembly (322).

The Code Collector assigns the validated BCODEs to the Code Merger, which is responsible for reconstructing the original file. The Code Merger arranges the BCODEs into their original sequence using the unique identifiers, ensuring that the file is reassembled accurately and without errors (324, 326). Once the file is fully reconstructed, it is sent to the File Pool, a secure storage location where it is made available to the Receiver (328). The Receiver retrieves the reassembled file from the File Pool and completes the data transmission process (330).

Throughout the process, the WIDS Pool, WFQ Scheduler, and VFT Controller continuously monitor transmission performance, including metrics such as latency, validation success rates, and retransmissions. These components dynamically adjust their calculations and scheduling priorities to maintain optimal network performance (332). At the conclusion of the transmission, the WIDS Pool aggregates the collected performance data into a detailed report, which includes recommendations for improving future transmissions. These recommendations leverage predictive analytics and historical trends to suggest adjustments to scheduling, resource allocation, and retransmission strategies (334).

FIG. 4 is an exemplary flow diagram that illustrates the registration algorithm, detailing the steps required for distributed systems, senders, and receivers to register within the network and obtain their unique identifiers. The process begins with distributed computers, senders, and receivers installing the necessary client software to interact with the system (400). This installation step ensures that the devices have the required components to generate and manage Whisper System Identifiers (WSIDs). Once the client is installed, each system obtains its WSID, a unique identifier critical for ensuring the system's registration and identification within the network.

Following the installation and WSID acquisition, the system sends a request to the registration server to generate a WID (402). This step initiates the formal registration process, signaling the server to evaluate the request and prepare for the subsequent computations. The registration server then examines the incoming request to determine its type (404). If the request is identified as a distributed request, the system proceeds to calculate the Code Processing Capacity (CPC) for the requesting system. The CPC is computed using a formula that raises the base value of 1000 to the power of the sum of the system's available RAM and the number of processor quads (406). This calculation is designed to provide a precise measure of the system's computational capabilities, allowing the network to allocate resources effectively and balance workloads across distributed systems.

If the request is not a distributed request, or once the CPC calculation is complete for distributed requests, the system generates the WID (408). The WID is created by concatenating the WSID with additional system-specific parameters, including the IP address, MAC address, and WHASSING. This combination ensures that the WID is both unique and comprehensive, encapsulating all necessary information about the system to facilitate its identification and management within the network.

Finally, the generated WID is returned to the requesting client (410). This step marks the completion of the registration process, providing the client with a unique identifier that can be used for subsequent interactions within the network. By following this detailed sequence of operations, the registration algorithm ensures that all systems are uniquely identified, their processing capacities are evaluated, and they are properly integrated into the network. This enables efficient resource allocation, workload distribution, and secure system management, forming the foundation for the broader functionality of the distributed network.

FIG. 5 is an exemplary flow diagram that provides a comprehensive view of the data or file sending algorithm, detailing each step in the process of preparing, segmenting, coding, and transmitting a file through a connection with the Weighted Fair Queueing (WFQ) system. The process begins with the sender generating a connection to the WFQ system. This initial step establishes communication between the sender and the system while simultaneously retrieving the Whisper System Identifier (WID), which serves as a unique identifier for the sender. This WID is critical for secure communication, ensuring that the sender is authenticated and authorized to transmit data within the system (500). The establishment of this secure connection sets the foundation for the subsequent steps, enabling efficient and organized file transmission.

Following the establishment of the connection, the sender selects the specific file that needs to be transmitted from its local file system (502). This selection marks the starting point of the data handling process, where the chosen file is prepared for transmission. Once the file is selected, it undergoes a segmentation process where it is divided into smaller, byte-sized units for easier handling and transmission. For instance, the file may be broken down into a byte stream represented as 0,0,0,1,0,0,1,1,1,0,0,1,0,1,1,0,10 (504). This segmentation is an essential step as it allows the data to be processed at a granular level, enabling precise tracking and validation of each individual byte during its journey through the network.

As each byte is created during segmentation, the system assigns a unique code to every byte to facilitate its identification and tracking throughout the transmission process. These codes are generated sequentially, such as 0, 1, 2, 3, . . . n, and are tied to each byte in the stream (506). The purpose of these codes is to ensure that each byte can be distinctly referenced, which is critical for later stages of validation and reassembly. The algorithm continues iterating through the entire byte stream, assigning a unique code to every byte until all data within the selected file has been processed. This ensures that no byte is left uncategorized or untracked, maintaining the integrity of the overall file transmission process (508).

Once the segmentation and coding processes are complete, each byte, along with its assigned code, is sent to the WFQ system for scheduling and prioritization (510). The WFQ system evaluates the incoming byte stream and organizes the transmission of bytes based on their assigned priority weights. These weights are determined dynamically, taking into account the criticality of each byte and current network conditions such as bandwidth availability and latency. By prioritizing higher-weighted bytes, the WFQ system ensures that critical data is transmitted first, optimizing the overall efficiency of the transmission. Furthermore, the WFQ system is designed to dynamically adapt its scheduling priorities in real time, enabling it to respond effectively to fluctuating network conditions and ensure reliable delivery of all data.

The flow diagram depicted in FIG. 5 expands on the data/file sending algorithm by providing a granular view of the processes that enable secure and efficient file transmission in a distributed system. The systematic segmentation of the file into byte-sized units, the assignment of unique codes to each byte, and the dynamic prioritization of data within the WFQ system all work together to ensure the reliability, security, and performance of the transmission. This robust approach enables the system to handle complex transmission scenarios with precision and adaptability, making it a powerful solution for managing data in distributed network environments.

FIG. 6 is an exemplary flow diagram that comprehensively illustrates the intricate steps involved in the transmission algorithm using a WFQ-enabled Distributed ConnecLink system. The process begins when a byte is selected from the data stream and assigned to a specific string within ConnecLink. Each byte is uniquely mapped to a string, creating an organized framework for handling data. For instance, byte 0 may be assigned to string s1c2, and byte 1 to string s2c1, where the string identifier plays a crucial role in tracking the byte during the subsequent steps (600). After the assignment, the string containing the byte is sent to the Code Assignment Tab within the WFQ system. This step is vital for preparing the byte for the next phase of processing and transmission (602).

The Code Assignment Tab processes the data by routing each byte to a specific string block, where further operations are carried out. Each string block serves as an organizational container that ensures the byte is logically managed within the system (604). Following this, the respective distributed machine validates the integrity of each block assigned by the Code Assignment Tab. This validation step ensures that the data conforms to predefined system standards, which is critical for avoiding errors during transmission (606). Once validated, the byte moves into the scheduling phase, where the WFQ module determines the order in which the data packets will be transmitted. The WFQ module uses priority-based algorithms to schedule packets, considering factors such as their criticality and real-time network conditions. This ensures efficient and fair distribution of network resources during transmission (608).

The Code Assignment Tab then performs ConnecLink operations to manage and streamline the scheduling process. This module oversees the proper alignment and prioritization of bytes, ensuring that the transmission pipeline operates efficiently (610). The process continues iteratively, repeating step 8, where bytes are processed one by one until the BCODE table, which stores the list of all bytes to be transmitted, becomes empty. This iterative approach ensures that no byte is left unprocessed during the transmission process (612).

In step 8, the Code Assignment Tab retrieves bytes from the BCODE list and assigns them to random hybrid strings. These hybrid strings are passed to a hybrid system that creates blocks and assigns them to a chain, continuing the chaining process for organized data management. This step ensures that the data is encapsulated in a structured manner for efficient handling and validation (614). Each byte within a block is then validated by verifying its start and end nodes to ensure accuracy and integrity. If the validation is successful, the process moves to the next stage. However, if an error is detected, the affected byte is sent back to the Code Assignment Tab for reassignment, and the process resumes from step 6 to correct the issue (616, 618, 620).

Validated blocks are temporarily stored in the blocks interposer, a specialized module designed to hold blocks until further processing occurs (622). The blocks interposer then iterates through each stored block, reading its associated metadata to verify key information. As part of this step, the interposer checks if the intended receiver is online. If the receiver is confirmed to be online, the block proceeds to the next step in the process. If the receiver is offline, the interposer skips the current block, moves to the next available block, and repeats the verification process (624, 626, 628).

Once the receiver is determined to be online, the block is transmitted to the receiver or destination (630). Upon receipt of the block, the receiver processes it using a received block analyzer, which validates the integrity and completeness of the data (632). After validation, the system checks if the block corresponds to an existing file in the file pool. If the file exists, the byte is transferred to the file pool along with a merge request to integrate it into the existing file. If no corresponding file exists, the byte is transferred with a new creation request to initiate a new file in the file pool (634).

For blocks corresponding to existing files, the file pool merges the byte into the appropriate file, ensuring the data is accurately reassembled (636). If the block corresponds to a new file, the file pool processes the byte and incorporates it into the new file creation workflow (638). Once all bytes associated with the file have been successfully processed, merged, and reassembled in the file pool, the fully reconstructed file is saved to the user's system. This final step ensures that the data is complete and available for user access (640).

This flow diagram expands on the intricate details of the transmission algorithm, highlighting the step-by-step operations that govern byte selection, validation, chaining, metadata processing, scheduling, and reassembly. Each numbered step ensures the reliability, security, and efficiency of the data transmission process. The integration of WFQ scheduling allows for dynamic prioritization based on real-time conditions, while the chaining and validation mechanisms ensure the integrity of the transmitted data. By combining these advanced processes, FIG. 6 demonstrates a robust system capable of handling complex transmission scenarios in distributed environments.

FIG. 7 illustrates the first sample process flow diagram for the technical solution, providing a detailed representation of the steps and interactions involved in enabling secure and efficient data transmission within the system. The process begins with a request being generated at the initiation point, labeled as step 700. This request triggers the system to assign data transmission timing using the Virtual Finishing Time (VFT) module at step 702. The VFT module plays a critical role in calculating the optimal timing for data transmission based on system priorities and real-time network conditions, ensuring efficient scheduling and minimized latency.

Once the data transmission timing is assigned, the system proceeds to step 704, where it calculates and analyzes the blocks of data in conjunction with the system configuration. This calculation is based on the formula Code Processing Capacity (CPC)=1000 raised to the power of the sum of the available RAM and the number of processor quads. This step is vital for determining the computational capabilities of the distributed systems involved, ensuring the network can dynamically allocate resources based on the performance characteristics of each participating system.

In step 706, the Whisper System Identifier (WSID) is combined with the system's IP address, MAC address, and WHASHING (a cryptographic salt) to generate a unique Whisper Identifier (WID). This WID is used as a secure and silent identifier within the system, enabling encrypted and authenticated communication between distributed components. The generated WID is then stored in the WID's pool at step 708, where it is maintained alongside other identifiers for efficient retrieval and management during data transmission processes.

The process continues at step 710, where the Weighted Fair Queueing (WFQ) module takes over to enable data scheduling. The WFQ module dynamically prioritizes data packets based on their assigned weights and real-time network metrics, ensuring that high-priority packets are transmitted first while maintaining overall fairness across the transmission pipeline. This scheduling mechanism optimizes the network's performance, balancing throughput and responsiveness.

Finally, the process concludes with a response being generated at step 712, completing the data transmission workflow. The response signifies that the requested data has been successfully processed and transmitted using the defined secure mechanisms. The accompanying notes clarify key terms and concepts within the diagram, explaining that CPC refers to code processing capacity, and that the "W" in WID stands for Whisper, emphasizing that the data transfer using WIDs is both silent and secured. This diagram represents a seamless integration of computation, security, and network optimization, providing a robust framework for distributed data transmission.

FIG. 8 illustrates the second sample process flow diagram for the technical solution, focusing on the steps and components involved in analyzing bits, managing file associations, and handling computational resources during data processing. The process begins at step 800, where the system initializes the workflow to analyze incoming data bits. At step 802, the Bits Analyzer takes responsibility for determining whether the analyzed byte belongs to a new file or an existing file within the file pool. This step is critical as it allows the system to efficiently classify data and manage resources based on the file's status.

If the Bits Analyzer identifies that the byte belongs to a new file, the system proceeds to step 804, where a code is assigned to the file. The assigned code acts as a unique identifier, ensuring that the new file can be securely tracked and managed throughout the subsequent processes. In the event that the byte is confirmed as belonging to a new file, the process advances to step 806, where a new file is created within the file pool. This file pool serves as a central repository for managing files during processing, with mechanisms in place to release files only after their processing is fully completed, as noted in the accompanying text.

For existing files, the byte is associated with its corresponding file in the pool, and the process proceeds to the next stage, where computational resources are allocated. At step 808, the system evaluates and allocates computing resources, represented as F1, F2, and F3. These resources symbolize the processing capabilities available to manage the file's data, ensuring that the system can handle multiple files or data streams simultaneously with optimal efficiency. The allocation of resources is dynamically managed to address varying computational demands, ensuring that each file receives adequate processing power.

Finally, the processed data is directed to the receiver file system at step 810. This stage represents the end point of the workflow, where the data is securely transferred to its intended destination. The receiver file system ensures that the data is appropriately stored, accessible, and integrated into its respective file structure.

The accompanying notes emphasize the critical roles of the Bits Analyzer and the file pool. The Bits Analyzer is specifically tasked with identifying whether a byte pertains to a new file or an existing one, facilitating efficient data classification and processing. The file pool is noted for its controlled release mechanism, ensuring that files are only made available after all processing tasks are complete. This diagram highlights the seamless integration of data classification, resource allocation, and secure file management, providing a robust framework for efficient data handling in distributed systems.

FIG. 9 illustrates a sample block diagram for the technical solution, detailing the step-by-step workflow for handling requests, managing binary data, and validating data bits within a distributed system. The process begins at step 900, where a request is received to process data within the system. This request triggers the allocation of binary bits to the BCODE table at step 902. Here, the system assigns "N" binary bits to the BCODE table, linking each binary bit to a corresponding string code for identification and management. For example, binary bit 0 is linked to string code s1c2, and binary bit 1 is linked to string code s2c1. The table provides a clear mapping of binary bits to string codes, ensuring precise tracking during processing.

Once the BCODE table is populated, the workflow transitions to step 904, where the Code Assignment Tab, integrated with the Weighted Fair Queueing (WFQ) system, takes over. This tab utilizes WFQ algorithms to schedule data transmission by prioritizing BCODEs and their associated string codes based on predefined criteria. It dynamically allocates transmission order to optimize network performance while maintaining fairness. The tab also handles metadata such as previous and next code addresses, file codes, and string codes for each data packet.

At step 906, the system establishes a ConnecLink, which provides the logical connection framework for managing data blocks as they move through the workflow. This connection ensures that data flows seamlessly between distributed systems, maintaining the integrity of the BCODE and its associated metadata. The ConnecLink acts as a bridge to ensure synchronized processing across distributed environments.

The system then moves to step 908, where individual distributed systems validate the data bits. Each bit undergoes a rigorous validation process to ensure its accuracy and alignment with system requirements. The validation involves checking the binary data against expected values, string codes, and transmission metadata. If a bit fails validation, it is flagged, and corrective actions are initiated to reprocess or retransmit the bit. The diagram highlights multiple iterations of validation, reflecting the system's redundancy and error-handling capabilities to address potential data inconsistencies.

Once the bits successfully pass validation, they are sent to the Block Interposer at step 910. The Block Interposer temporarily holds validated blocks, ensuring they are correctly aligned for final transmission. It plays a critical role in maintaining data organization and preparing blocks for delivery to their final destination. The interposer also serves as a checkpoint, verifying that all associated metadata, including previous and next code addresses, aligns with the overall data structure.

Finally, the validated and organized blocks are sent to the destination at step 912. This stage represents the successful completion of the data handling process, where the destination system receives the fully processed and validated data. The destination system integrates the incoming blocks into its storage or operational framework, ensuring the data is available for further use or analysis.

The diagram emphasizes the importance of systematic tracking, validation, and error handling at each step. Key elements such as the BCODE table, WFQ-integrated Code Assignment Tab, ConnecLink, and Block Interposer highlight the robust design of the system, ensuring secure, efficient, and reliable data processing across distributed environments. Each component works in harmony to maintain data integrity, optimize transmission, and ensure that only validated data reaches its intended destination. FIG. 9 demonstrates a sophisticated and resilient approach to data management within complex distributed systems.

Pseudocode exemplars for implementing various aspects of this disclosure are set forth below with explanations for reference.

Pseudocode for the First Aspect of Invention (System Registration and Resource Allocation):

```
function RegisterSystem(systemDetails):
  WSID=GenerateWSID(systemDetails)
  CPC=CalculateCPC(systemDetails)
  StoreInRegistrationPool(WSID, CPC)
  return WSID
function GenerateWSID(systemDetails):
  return Hash(systemDetails.IP+system Details.MAC+
    systemDetails.SystemName)
function CalculateCPC(system Details):
  return systemDetails.RAM+
    emDetails.Processors*Multiplier)
function AllocateResources(transmissionDetails):
  systems=RetrieveFromRegistrationPool( )
  for system in systems:
    if system.CPC>=transmissionDetails.RequiredCPC:
      AssignTaskToSystem(system.WSID, transmissionDetails)
      UpdateRegistrationPool(system.WSID,
        newLoad=system.CPC transmissionDetails.RequiredCPC)
      return system.WSID
  raise Error("Insufficient resources")
function StoreInRegistrationPool(WSID, CPC):
  registrationPool[WSID]=CPC
function RetrieveFromRegistrationPool( ):
  return registrationPool.Values( )
```

This pseudocode initializes the system registration process by generating a unique WSID for each system using a hash function that combines system-specific details such as IP address, MAC address, and system name. The Code Processing Capacity (CPC) is calculated based on the system's RAM and processing power. Registered systems are stored in a registration pool, which maintains a mapping of WSIDs and their corresponding CPC values. When a transmission task is initiated, resources are allocated dynamically by retrieving systems from the registration pool and selecting one with sufficient CPC to handle the task. The pool is updated to reflect the system's reduced capacity post-assignment. This approach ensures efficient and secure system registration and resource management.

Pseudocode for the Second Aspect of Invention (Byte-Level File Transmission):

```
function TransmitFile(file):
  byteChunks=SegmentFileIntoBytes(file)
  for byte in byteChunks:
    BCODE=GenerateBCODE(byte)
    WFQ.Enqueue(byte, BCODE.Priority)
  while not WFQ.IsEmpty( ):
    byteToTransmit=WFQ.Dequeue( )
    if ValidateByte(byteToTransmit):
      Transmit(byteToTransmit)
    else:
      RetransmitByte(byteToTransmit)
function SegmentFileIntoBytes(file):
  return [file [i:i+ByteSize] for i in range(0, len(file),
    ByteSize)]
function GenerateBCODE(byte):
  return Hash(byte)+SequenceNumber(byte)
function ValidateByte(byte):
  return Hash(byte)==ReceivedHash(byte)
function RetransmitByte(byte):
  newPath=SelectAlternatePath(byte)
  Transmit(byte, path=newPath)
```

This pseudocode begins by segmenting the file into smaller byte-sized chunks. Each byte is assigned a unique identifier, or BCODE, using a hash function combined with its sequence number. These bytes are prioritized using the Weighted Fair Queueing (WFQ) algorithm, which enqueues them based on their priority. During transmission, each byte is validated using a hash comparison to ensure its integrity. If validation fails, the byte is retransmitted using an alternate path, chosen dynamically. This ensures secure, efficient, and granular handling of data during transmission, minimizing retransmission overhead and improving reliability.

Pseudocode for the Third Aspect of Invention (Optimized Transmission Using VFT):

```
function TransmitPackets(packets):
  for packet in packets:
    packet.VFT=CalculateVFT(packet)
    WFQ.Enqueue(packet, packet.Priority)
  while not WFQ.IsEmpty( ):
    packetToTransmit=WFQ.Dequeue( )
    Transmit(packetToTransmit)
    UpdateVFTs( )
function CalculateVFT(packet):
  return packet.Size/packet.Bandwidth+packet.Priority-
    Weight
function UpdateVFTs( ):
  for packet in WFQ.Queue( ):
    packet.VFT=CalculateVFT(packet)
function WFQ.Enqueue(packet, priority):
  Queue [priority].Insert(packet)
function WFQ.Dequeue( ):
  for priority in Sorted(Queue.Keys( )):
    if not Queue [priority].IsEmpty( ):
      return Queue [priority].Pop( )
  raise Error("No packets to transmit")
```

This pseudocode calculates a Virtual Finishing Time (VFT) for each data packet based on its size, bandwidth, and assigned priority weight. Packets are enqueued into WFQ, which maintains separate queues for each priority level. The VFT determines the order in which packets are transmitted, with the smallest VFT being processed first. After each transmission, the system recalculates the VFT for remaining packets to ensure the schedule remains optimized. This dynamic recalibration adapts to changes in network conditions, ensuring efficient bandwidth utilization and minimizing delays. By combining WFQ and VFT, the system achieves a fair and predictive scheduling framework for reliable data transmission.

These pseudocode examples provide detailed instructions for implementing each aspect of the different aspects of the three inventions, demonstrating their unique features and innovative methodologies.

A skilled artisan, upon reviewing the disclosure, will appreciate that there are numerous alternatives, modifications, combinations, and customizations that can be made to the systems and methods described herein.

The systems and methods described herein can be extended, customized, and modified in various ways while remaining within the spirit and scope of the disclosure. These alternatives, modifications, combinations, and customizations allow the described inventions to adapt to different applications, environments, and technological advancements. Below are detailed potential enhancements and variations for each invention and their components.

The system can incorporate machine learning algorithms to predict network conditions, dynamically adjust resource allocation, and refine Weighted Fair Queueing (WFQ) parameters for better prioritization of data transmissions. This adaptation would enable the system to handle varying network loads more effectively by anticipating potential congestion or failures.

Instead of relying solely on system-specific parameters such as IP and MAC addresses, the WSID and WID generation mechanisms can incorporate biometric or behavioral identifiers for enhanced security in systems requiring user-specific tracking. This approach would increase the applicability of the system to user-centric networks.

The system can support hybrid encryption schemes where different levels of encryption (e.g., symmetric and asymmetric) are applied to byte-sized units based on their criticality or sensitivity. This allows the system to balance security and processing overhead dynamically.

The byte segmentation and transmission method can be modified to include data compression algorithms for reducing transmission sizes without compromising data integrity. Compression can be tailored to specific data types for greater efficiency, such as lossless compression for textual data and adaptive compression for multimedia files.

The invention can be combined with edge computing paradigms, where data processing, segmentation, and validation are distributed closer to the data sources (e.g., IoT devices or remote sensors). This approach reduces latency and improves real-time performance in networks with decentralized architectures.

Instead of using WFQ exclusively, the system can incorporate multi-level queueing algorithms where certain traffic classes are subdivided into finer-grained priority levels. This modification provides even more precise control over resource allocation and scheduling in environments with diverse data flows.

For environments where packet loss is a significant concern, the system can introduce redundant encoding schemes such as erasure coding. This approach allows partial recovery of data from incomplete transmissions without the need for retransmission of all corrupted bytes.

The system can support customizable policies for resource allocation, where administrators define specific rules for prioritizing data types, user groups, or application categories. This customization makes the system more adaptable to organizational or operational priorities.

The Virtual Finishing Timing (VFT) mechanism can be enhanced by integrating real-time analytics that monitor network performance metrics, such as jitter, packet loss, and bandwidth utilization. This integration allows VFT calculations to reflect actual network conditions more accurately, improving overall transmission efficiency.

The dynamic path reassignment feature for corrupted bytes can be expanded to support geo-aware routing. This enhancement ensures that data takes the shortest or most secure path, considering geographical constraints or compliance with data sovereignty regulations.

The byte reassembly mechanism at the receiver's end can be modified to include context-aware reordering algorithms, which prioritize reassembly of critical data first. This customization benefits real-time applications where partial but timely data reconstruction is more valuable than waiting for complete file delivery.

Instead of static CPC calculations based on RAM and processor metrics, the system can integrate dynamic load monitoring to adjust CPC values in real time. This modification ensures that resource allocation decisions are based on the current operational state of each system.

The inventions can be combined to create an end-to-end data management system where registration, transmission, and scheduling seamlessly interact. For example, WSIDs and WIDs generated during registration can be directly utilized to inform WFQ priorities and VFT calculations, creating a cohesive framework.

For enhanced scalability, the registration pool can be distributed across multiple nodes using a blockchain-like architecture or a Holochain-based system. This decentralized approach ensures high availability and fault tolerance for registration and resource tracking.

The systems can include a simulation mode for testing and refining configurations before deployment in production environments. This mode allows network administrators to model potential network conditions and adjust parameters for optimal performance.

To extend its application to high-latency environments such as satellite communications, the system can incorporate latency-tolerant protocols that optimize packet scheduling and byte validation over long delays.

The inventions can be integrated with secure multiparty computation frameworks to enable privacy-preserving transmissions. This adaptation ensures that data integrity is maintained without exposing sensitive content, even to intermediate systems.

Customization can be made for specific industries, such as financial institutions or defense, by tailoring the algorithms for compliance with industry-specific standards or regulations. For example, WFQ prioritization rules can be customized for emergency data or regulatory reporting in finance.

The system can extend to support interoperability with other transmission frameworks by adopting standardized protocols such as HTTP/3, QUIC, or custom APIs. This ensures seamless integration with existing systems and networks.

The monitoring components of the system can be extended to include AI-driven anomaly detection, which identifies and mitigates potential issues such as security breaches or resource misallocations in real time.

These alternatives, modifications, combinations, and customizations illustrate the flexibility and extensibility of the described inventions. Each enhancement aligns with the core principles of efficient, secure, and reliable data transmission and management, demonstrating how the system can adapt to evolving needs and technologies.

Although the present technology has been described based on what is currently considered the most practical and preferred implementations, it is to be understood that this detail is only for that purpose and this disclosure is not limited to the sample descriptions and implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A method for secure byte-level file transmission across a distributed network, comprising:

segmenting, by a segmentation module on a transmitting system, a file into a plurality of byte-sized units, wherein each byte-sized unit is assigned a unique identifier comprising a string code and a sequence number;

scheduling, by a Weighted Fair Queueing (WFQ) module on the transmitting system, the transmission of the byte-sized units based on assigned priority weights corresponding to criticality of each byte-sized unit;

transmitting, by a transmitting module on the transmitting system, the byte-sized units to at least one distributed system, wherein the byte-sized units are transmitted in the order determined by the WFQ module;

validating, by a block interposer on the distributed system, integrity of each byte-sized unit during transmission, wherein validation is performed by comparing a hash of the transmitted byte-sized unit with an expected hash value;

retransmitting, by the transmitting module on the distributed system, any byte-sized unit identified as corrupted by the block interposer through an alternate path dynamically selected by the distributed system;

receiving, by a receiving module on a receiving system, the transmitted byte-sized units, wherein each received byte-sized unit is stored temporarily in a reassembly buffer;

validating and reassembling, by a byte collector on the receiving system, the received byte-sized units into their original sequence based on the unique identifiers, the sequence numbers, and the validation results of the received byte-sized units; and storing, by the receiving system, a reassembled file in its original format, wherein the system ensures the integrity and order of the file through the validation and reassembly process.

2. The method of claim 1, wherein the unique identifier assigned to each byte-sized unit by the segmentation module further comprises a timestamp to track transmission time of the byte-sized unit.

3. The method of claim 2, wherein the WFQ module dynamically adjusts the priority weights assigned to the byte-sized units based on network conditions, including bandwidth availability and latency.

4. The method of claim 3, wherein the block interposer further performs an encryption integrity check by verifying that each byte-sized unit has been transmitted with its associated cryptographic key.

5. The method of claim 4, wherein the alternate path selected by the distributed system for retransmission is determined based on a combination of geographic proximity and network reliability metrics.

6. The method of claim 5, wherein the receiving module includes a preliminary validation step to discard any byte-sized units received from unauthorized sources before they are stored in the reassembly buffer.

7. The method of claim 6, wherein the byte collector is configured to detect and correct errors in the sequence numbers of received byte-sized units by referencing a predefined transmission order.

8. The method of claim 7, wherein the reassembly buffer includes a time-based expulsion mechanism to remove unvalidated or incomplete byte-sized units after a predefined time period.

9. The method of claim 8, wherein the transmitting system includes a feedback module configured to notify the WFQ module of retransmission requests to update scheduling priorities dynamically.

10. The method of claim 9, wherein the receiving system generates a transmission log after reassembly, including metrics such as the number of retransmissions, validation failures, and transmission times for each byte-sized unit.

11. A method for secure and efficient byte-level file transmission across a distributed network, comprising:

segmenting, by a segmentation module on a transmitting system, a file into a plurality of byte-sized units, wherein each byte-sized unit is assigned a unique identifier comprising a string code, a sequence number, and a timestamp to track transmission time;

scheduling, by a Weighted Fair Queueing (WFQ) module on the transmitting system, the transmission of the byte-sized units based on dynamically adjusted priority weights corresponding to criticality of each byte-sized unit and network conditions, including bandwidth availability and latency;

transmitting, by a transmitting module on the transmitting system, the byte-sized units to at least one distributed system, wherein the byte-sized units are transmitted in the order determined by the WFQ module;

validating, by a block interposer on the distributed system, the integrity of each byte-sized unit during transmission, wherein validation includes comparing a hash of the transmitted byte-sized unit with an expected hash value and verifying encryption integrity using a cryptographic key associated with the byte-sized unit;

retransmitting, by the transmitting module on the distributed system, any byte-sized unit identified as corrupted by the block interposer, through an alternate path determined dynamically based on geographic proximity and network reliability metrics;

receiving, by a receiving module on a receiving system, the transmitted byte-sized units, wherein each received byte-sized unit is preliminarily validated to discard any byte-sized units from unauthorized sources before being stored in a reassembly buffer;

validating and reassembling, by a byte collector on the receiving system, the received byte-sized units into their original sequence by referencing the unique identifiers, sequence numbers, and validation results, and correcting any errors in the sequence numbers by referencing a predefined transmission order;

storing, by the receiving system, a reassembled file in its original format, wherein the reassembly buffer includes a time-based expulsion mechanism to remove unvalidated or incomplete byte-sized units after a predefined time period;

notifying, by a feedback module on the transmitting system, the WFQ module of retransmission requests to dynamically update scheduling priorities for any affected byte-sized units; and generating, by the receiving system, a transmission log after reassembly, wherein the log includes metrics such as the number of retransmissions, validation failures, and transmission times for each byte-sized unit to provide insights into transmission performance and reliability.

12. A system for secure and efficient byte-level file transmission across a distributed network, comprising:

a segmentation module on a transmitting system configured to segment a file into a plurality of byte-sized units, wherein each byte-sized unit is assigned a unique identifier comprising a string code, a sequence number, and a timestamp to track transmission time;

a Weighted Fair Queueing (WFQ) module on the transmitting system configured to schedule the transmission of the byte-sized units based on dynamically adjusted priority weights, wherein the adjustment accounts for criticality of each byte-sized unit and network conditions including bandwidth availability and latency;

a transmitting module on the transmitting system configured to transmit the byte-sized units in the order determined by the WFQ module to at least one distributed system;

a block interposer on the distributed system configured to validate the integrity of each transmitted byte-sized unit, wherein validation includes comparing a hash of the transmitted byte-sized unit with an expected hash value and verifying encryption integrity using a cryptographic key associated with the byte-sized unit;

a retransmission module on the distributed system configured to retransmit any byte-sized unit identified as corrupted by the block interposer, through an alternate path dynamically determined based on geographic proximity and network reliability metrics;

a receiving module on a receiving system configured to receive the transmitted byte-sized units and preliminarily validate them to discard any byte-sized units received from unauthorized sources before storing them in a reassembly buffer;

a byte collector on the receiving system configured to validate and reassemble the received byte-sized units into their original sequence, wherein the byte collector references the unique identifiers, sequence numbers, and validation results, and corrects errors in the sequence numbers by referencing a predefined transmission order;

a reassembly buffer on the receiving system configured to temporarily store byte-sized units, wherein the reassembly buffer includes a time-based expulsion mechanism to remove unvalidated or incomplete byte-sized units after a predefined time period;

a feedback module on the transmitting system configured to notify the WFQ module of retransmission requests to dynamically update scheduling priorities for affected byte-sized units; and a logging module on the receiving system configured to generate a transmission log after reassembly, wherein the log includes metrics such as the number of retransmissions, validation failures, and transmission times for each byte-sized unit to provide insights into transmission performance and reliability.

13. The system of claim 12, wherein the segmentation module is further configured to compress each byte-sized unit before assigning the unique identifier to reduce overall file size during transmission.

14. The system of claim 13, wherein the WFQ module is further configured to prioritize byte-sized units containing critical control information over those containing non-critical data by assigning higher priority weights to the control information units.

15. The system of claim 14, wherein the block interposer is further configured to perform deep packet inspection on each byte-sized unit to detect potential security threats, including malicious payloads or unauthorized alterations.

16. The system of claim 15, wherein the retransmission module dynamically selects alternate paths for retransmitting corrupted byte-sized units based on real-time network performance metrics, including latency and packet loss rates.

17. The system of claim 16, wherein the receiving module is further configured to calculate and store a trust score for each distributed system based on validation success rate of byte-sized units received from that system.

18. The system of claim 17, wherein the byte collector is further configured to generate error correction codes for byte-sized units flagged as corrupted, enabling reconstruction of the original file without requiring retransmission of the flagged units.

19. The system of claim 18, wherein the logging module is further configured to generate and transmit periodic summary reports to an administrator, wherein the reports include aggregated metrics for system-wide transmission performance and recommendations for optimizing future transmissions.

20. The system of claim 19, further comprising:

a registration server configured to register a plurality of distributed systems, wherein each distributed system is associated with system-specific parameters including an Internet Protocol (IP) address, a Media Access Control (MAC) address, and a system identifier;

a WSID generation module on the registration server configured to generate a unique Whisper System Identifier (WSID) for each distributed system based on a cryptographic hash function that combines the system-specific parameters and a dynamically generated cryptographic salt, wherein the salt is created using a timestamp and a system-specific secret key;

a registration pool module on the registration server configured to store the WSIDs along with corresponding system-specific parameters and dynamically updated resource information for each distributed system;

a CPC evaluation module on the registration server configured to calculate and periodically update a code processing capacity (CPC) value for each distributed system based on available memory, processor capabilities, and real-time operational states;

a Virtual Finishing Timing (VFT) module on the transmitting system configured to calculate a virtual finishing time for each byte-sized unit based on the size of the byte-sized unit, its dynamically adjusted priority weight, and current load on the distributed system, wherein the VFT module recalibrates the virtual finishing times of remaining byte-sized units after each transmission;

a task allocation module on the registration server configured to select distributed systems for handling transmission tasks based on the CPC values and dynamically reallocate tasks in response to network load changes or failures of previously selected systems;

a reporting module on the registration server configured to provide real-time monitoring and reporting of WSIDs, CPC values, transmission statuses, and byte validation metrics across the network to ensure efficient, secure, and optimized data transmission; and a logging module on the receiving system further configured to include information from the reporting module in its periodic summary reports, including network-wide resource allocation data, reassembly performance statistics, and recommendations for enhancing transmission scheduling and reliability.

* * * * *